US012681779B2

(12) United States Patent
Wang

(10) Patent No.: US 12,681,779 B2
(45) Date of Patent: Jul. 14, 2026

(54) TOUCH DATA PROCESSING METHOD, APPARATUS, DEVICE AND STORAGE MEDIUM

(71) Applicants:GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventor: Jiayu Wang, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 502 days.

(21) Appl. No.: 17/953,331

(22) Filed: Sep. 27, 2022

(65) Prior Publication Data

US 2023/0018519 A1     Jan. 19, 2023

Related U.S. Application Data

(63) Continuation of application No. PCT/CN2020/139610, filed on Dec. 30, 2020.

(30) Foreign Application Priority Data

Aug. 14, 2020    (CN) .......................... 202010821331.7

(51) Int. Cl.
*G06F 9/54* (2006.01)
*G06F 1/16* (2006.01)
*G06F 3/04883* (2022.01)

(52) U.S. Cl.
CPC ............ *G06F 9/542* (2013.01); *G06F 1/1675* (2013.01); *G06F 3/04883* (2013.01)

(58) Field of Classification Search
CPC .... G06F 9/542; G06F 1/1675; G06F 3/04883; G06F 3/1431; G06F 3/1454;
(Continued)

(56) References Cited

U.S. PATENT DOCUMENTS 6,686,909 B1 *    2/2004    Endo ..................... G06F 1/1601
                                                                345/173
11,487,423 B2 *   11/2022   Hassan ............... G06F 3/04883
(Continued)

FOREIGN PATENT DOCUMENTS

CN          104020989 A      9/2014
CN          106095084 A      11/2016
(Continued)

OTHER PUBLICATIONS

Wikipedia—Rotation matrix, Jul. 22, 2020, Wikipedia, pp. 1-23 (Year: 2020).*
(Continued)

*Primary Examiner* — Kevin L Young
*Assistant Examiner* — Jennifer Marie Gutman
(74) *Attorney, Agent, or Firm* — BAYES PLLC

(57)                ABSTRACT

The present disclosure provides a touch data processing method, apparatus, device and storage medium. A display content from the second operating system is displayed on a display interface of the first operating system, and after a touch screen on a device where the first operating system is located is rotated by a preset angle, if a touch operation on the touch screen is detected, whether the touch operation is an operation on a display content in the target display area is determined; if yes, touch data corresponding to the touch operation can be sent to the second operating system, so that
(Continued)

the second operating system responds to the touch operation. The present disclosure realizes that even if the touch screen on the device where the first operating system is located is rotated, the second operating system can be controlled to respond to the touch operation by touching the touch screen.

19 Claims, 21 Drawing Sheets

(58) Field of Classification Search
CPC .......... G06F 2200/1614; G06F 1/1643; G06F 1/1694; G06F 3/0488; G06F 3/0346
See application file for complete search history.

(56) References Cited

U.S. PATENT DOCUMENTS

| | | | | |
|---|---|---|---|---|
| 2004/0164958 | A1* | 8/2004 | Park | G06F 1/1616 |
| | | | | 345/158 |
| 2006/0244735 | A1* | 11/2006 | Wilson | G06F 3/0488 |
| | | | | 345/173 |
| 2008/0109763 | A1* | 5/2008 | Lee | G06F 3/0488 |
| | | | | 715/856 |
| 2009/0109195 | A1* | 4/2009 | Kent | G06F 3/0418 |
| | | | | 345/178 |
| 2012/0144283 | A1* | 6/2012 | Hill | G06F 40/171 |
| | | | | 709/204 |
| 2013/0057493 | A1* | 3/2013 | Hwang | G06F 3/0418 |
| | | | | 345/173 |
| 2013/0298140 | A1* | 11/2013 | Wolfe | G06F 9/542 |
| | | | | 719/319 |
| 2014/0122749 | A1* | 5/2014 | Ting | G06F 13/385 |
| | | | | 710/14 |
| 2014/0125605 | A1* | 5/2014 | Lin | G06F 3/0421 |
| | | | | 345/173 |
| 2014/0160043 | A1* | 6/2014 | Hwang | G06F 3/0418 |
| | | | | 345/173 |
| 2014/0184868 | A1* | 7/2014 | Takahashi | H04N 23/531 |
| | | | | 348/333.01 |
| 2014/0191994 | A1* | 7/2014 | Chung | G06F 9/45533 |
| | | | | 345/173 |
| 2014/0223432 | A1* | 8/2014 | Halim | G06F 9/452 |
| | | | | 718/1 |
| 2015/0116365 | A1* | 4/2015 | Ding | G06F 1/1694 |
| | | | | 345/659 |
| 2015/0346855 | A1* | 12/2015 | Momchilov | G06F 3/04886 |
| | | | | 345/173 |
| 2016/0330404 | A1* | 11/2016 | Nelson | H04M 7/0027 |
| 2017/0220537 | A1* | 8/2017 | Nelson | G06F 3/04842 |
| 2017/0257403 | A1* | 9/2017 | Li | G06F 3/1454 |
| 2017/0358278 | A1* | 12/2017 | Lee | G09G 5/001 |
| 2018/0070389 | A1* | 3/2018 | Morgan | H04W 76/10 |
| 2018/0173395 | A1* | 6/2018 | Lee | G06F 3/04883 |
| 2018/0232118 | A1 | 8/2018 | Forlenza et al. | |
| 2019/0268562 | A1* | 8/2019 | Wu | H04N 21/4438 |
| 2019/0370056 | A1* | 12/2019 | Yoo | G06F 3/04842 |
| 2020/0133475 | A1 | 4/2020 | Yeh et al. | |
| 2020/0192539 | A1* | 6/2020 | Li | G06F 3/04845 |
| 2020/0333994 | A1* | 10/2020 | Sepulveda | G06F 3/0416 |
| 2020/0410954 | A1* | 12/2020 | Kang | G06F 9/543 |

FOREIGN PATENT DOCUMENTS

| | | | | |
|---|---|---|---|---|
| CN | 106648408 | A | 5/2017 | |
| CN | 109144396 | A | 1/2019 | |
| CN | 110377250 | A | 10/2019 | |
| CN | 110381195 | A | 10/2019 | |
| CN | 110597474 | A | 12/2019 | |
| CN | 110662095 | A | 1/2020 | |
| CN | 112035048 | A | 12/2020 | |
| IN | 203465706 | U | 3/2014 | |
| WO | WO-2018090735 | A1 * | 5/2018 | H04L 12/12 |

OTHER PUBLICATIONS

Machine-Generated Translation of WO 2018090735 A1 (Year: 2018).*

International Search Report issued in corresponding international application No. PCT/CN2020/139610, dated May 21, 2021, 2 pages.

First Office Action issued in corresponding Chinese application No. 202010821331.7, dated Jul. 21, 2021, 11 pages.

* cited by examiner

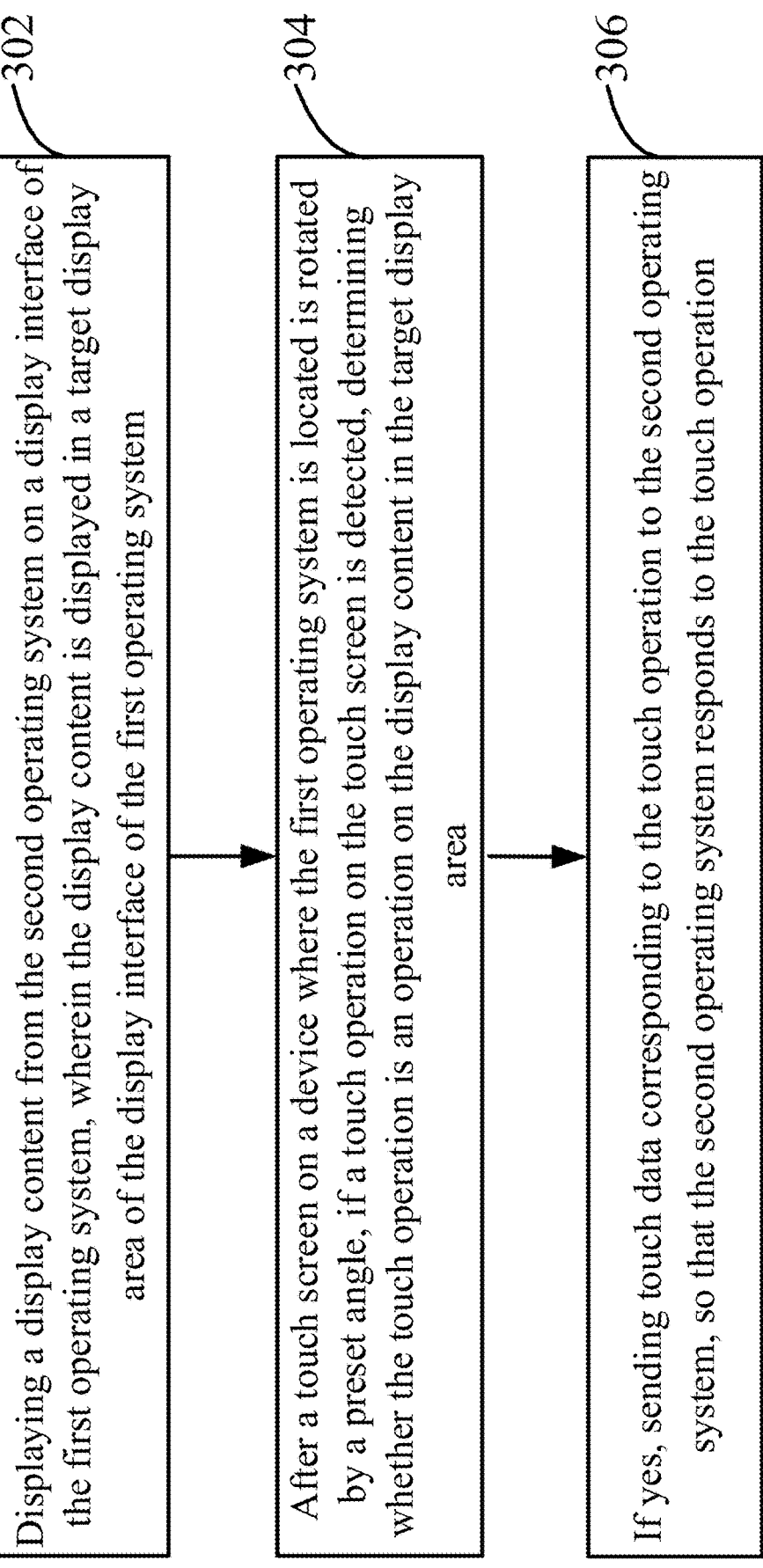

302

Displaying a display content from the second operating system on a display interface of the first operating system, wherein the display content is displayed in a target display area of the display interface of the first operating system

304

After a touch screen on a device where the first operating system is located is rotated by a preset angle, if a touch operation on the touch screen is detected, determining whether the touch operation is an operation on the display content in the target display area

306

If yes, sending touch data corresponding to the touch operation to the second operating system, so that the second operating system responds to the touch operation

Fig. 3

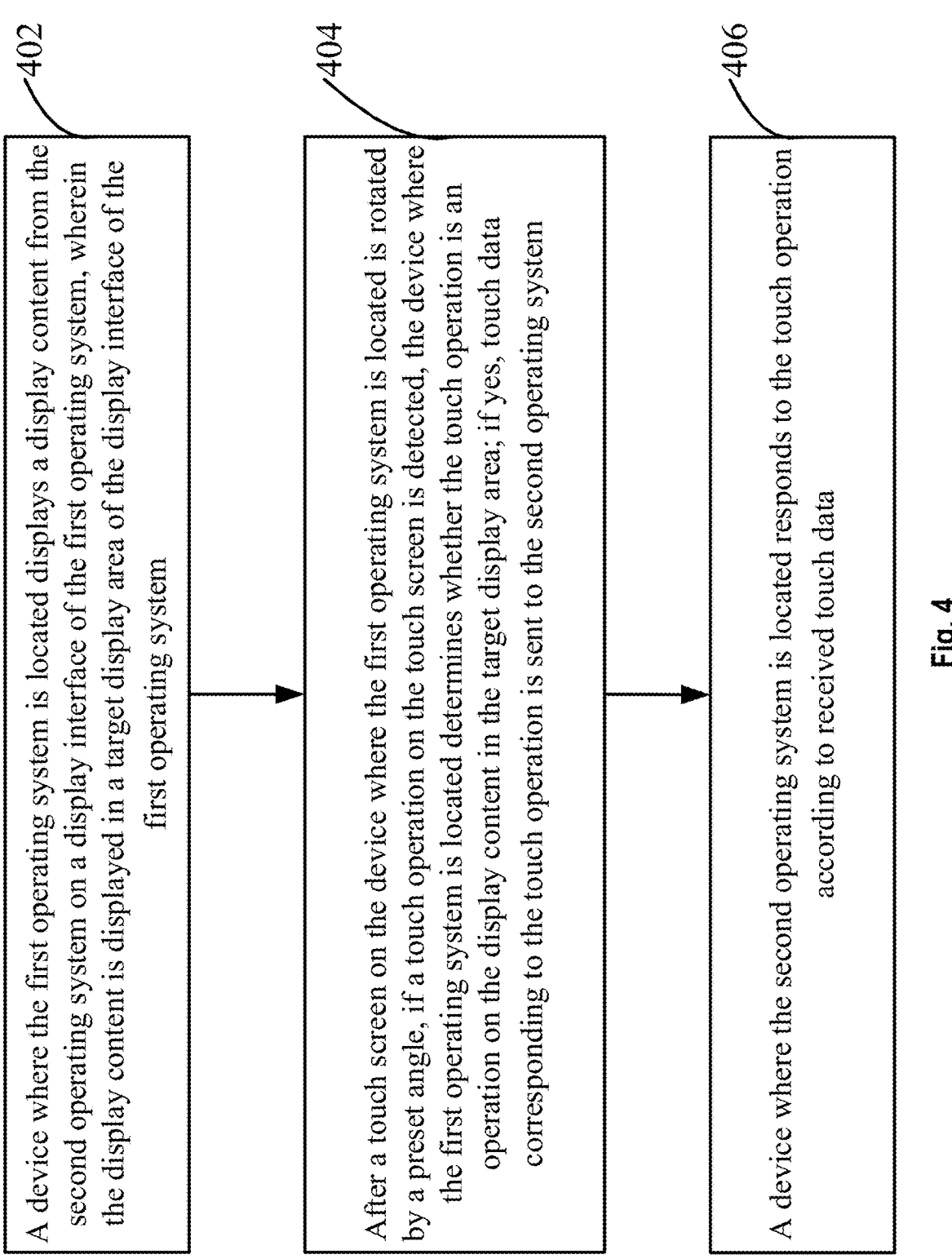

402

A device where the first operating system is located displays a display content from the second operating system on a display interface of the first operating system, wherein the display content is displayed in a target display area of the display interface of the first operating system

404

After a touch screen on the device where the first operating system is located is rotated by a preset angle, if a touch operation on the touch screen is detected, the device where the first operating system is located determines whether the touch operation is an operation on the display content in the target display area; if yes, touch data corresponding to the touch operation is sent to the second operating system

406

A device where the second operating system is located responds to the touch operation according to received touch data

Fig. 4

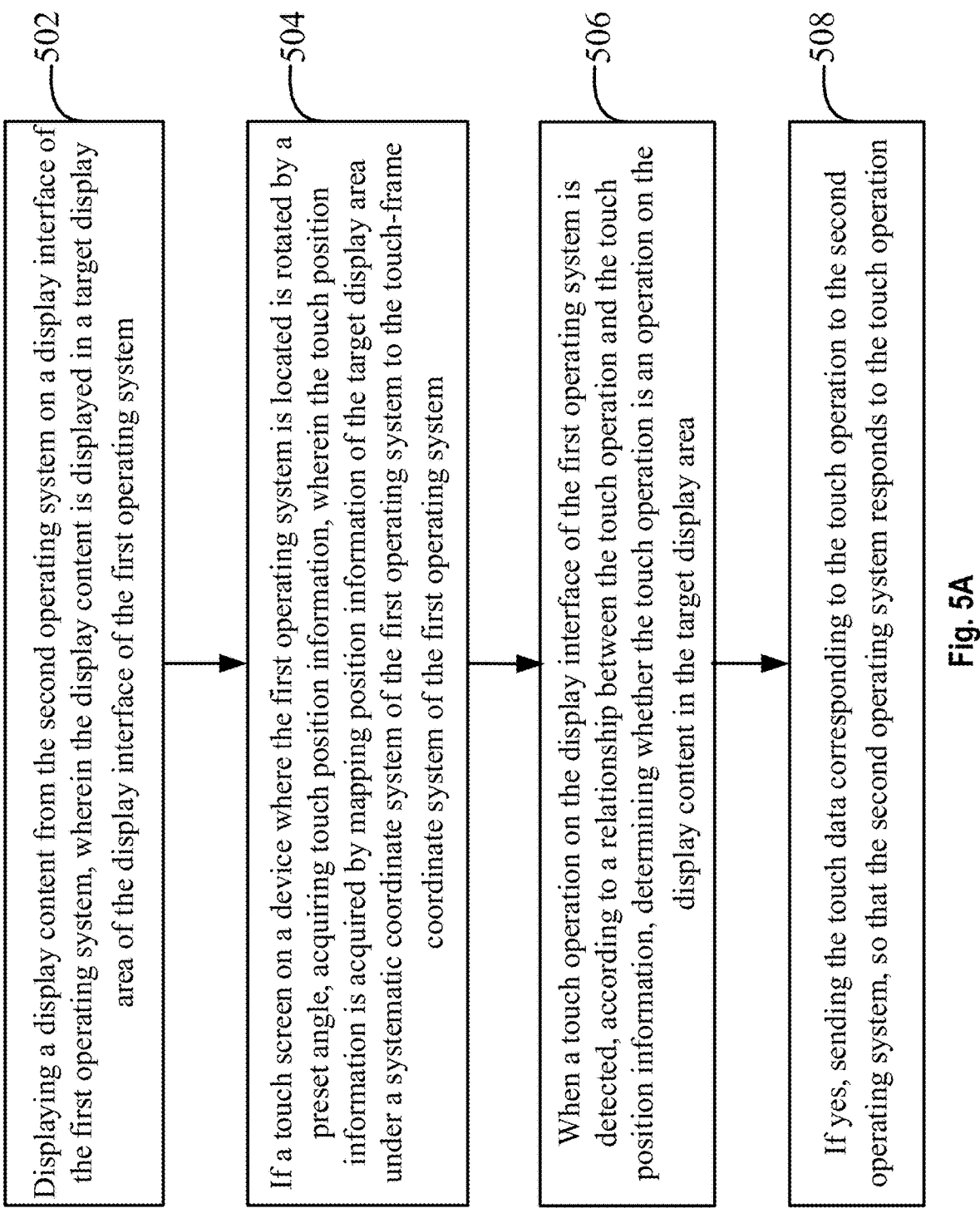

502

Displaying a display content from the second operating system on a display interface of the first operating system, wherein the display content is displayed in a target display area of the display interface of the first operating system

504

If a touch screen on a device where the first operating system is located is rotated by a preset angle, acquiring touch position information, wherein the touch position information is acquired by mapping position information of the target display area under a systematic coordinate system of the first operating system to the touch-frame coordinate system of the first operating system

506

When a touch operation on the display interface of the first operating system is detected, according to a relationship between the touch operation and the touch position information, determining whether the touch operation is an operation on the display content in the target display area

508

If yes, sending the touch data corresponding to the touch operation to the second operating system, so that the second operating system responds to the touch operation

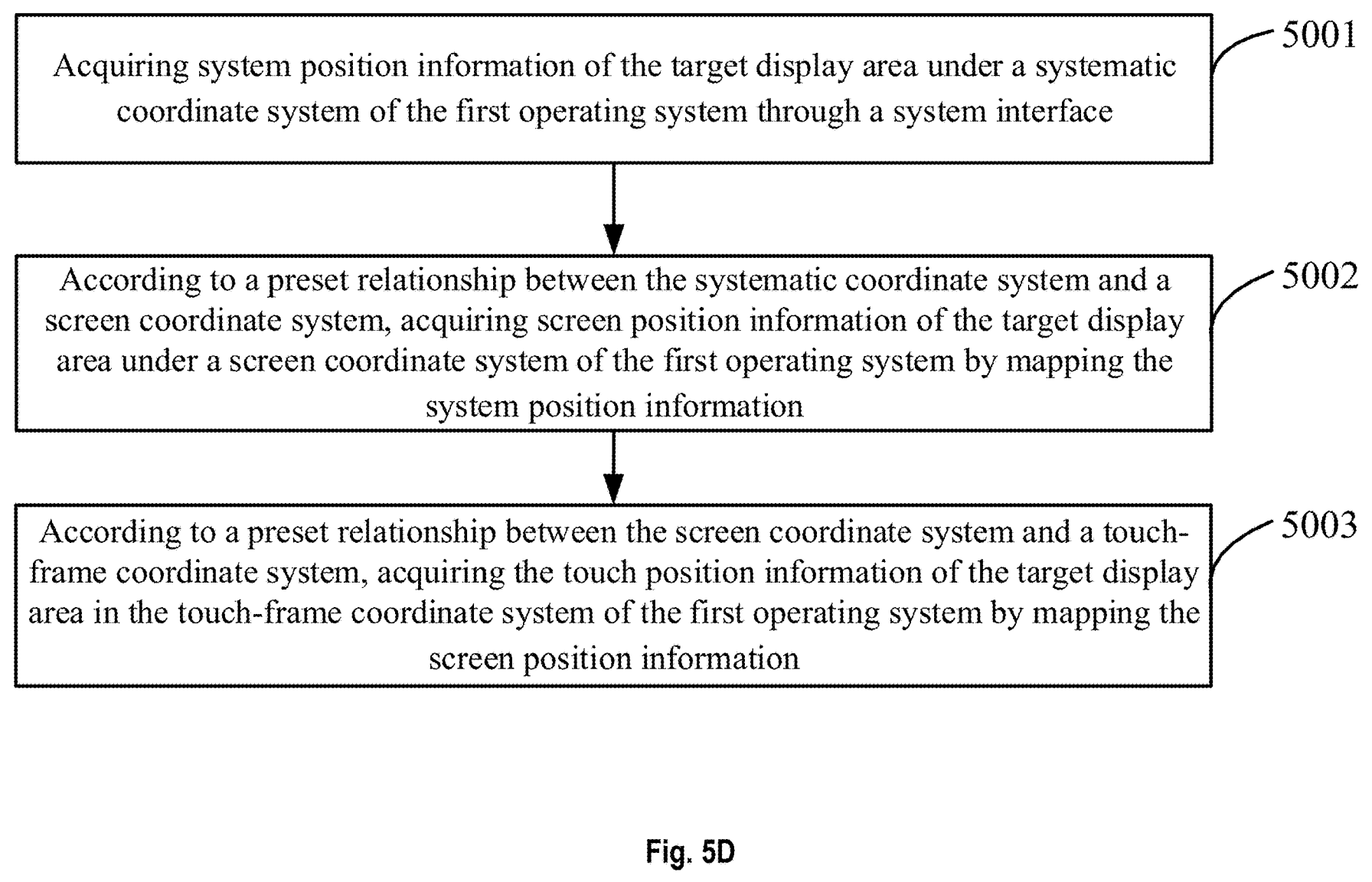

Acquiring system position information of the target display area under a systematic coordinate system of the first operating system through a system interface

5002

According to a preset relationship between the systematic coordinate system and a screen coordinate system, acquiring screen position information of the target display area under a screen coordinate system of the first operating system by mapping the system position information

5003

According to a preset relationship between the screen coordinate system and a touch-frame coordinate system, acquiring the touch position information of the target display area in the touch-frame coordinate system of the first operating system by mapping the screen position information

Fig. 5D

Display interface of external channel system

Display interface of Android main system

Window of external channel system

Close

File browser application of Android

TOUCH DATA PROCESSING METHOD, APPARATUS, DEVICE AND STORAGE MEDIUM

CROSS-REFERENCE TO RELATED APPLICATIONS

The present application is a continuation of International Application No. PCT/CN2020/139610, filed on Dec. 30, 2020, which claims the benefit of priority to Chinese Patent Application No. 202010821331.7, filed on Aug. 14, 2020. The entire contents of each of the above-identified applications are expressly incorporated herein by reference.

TECHNICAL FIELD

The present disclosure relates to the technical field of intelligent devices, and in particular to a touch data processing method, apparatus, device and storage medium.

BACKGROUND

All types of intelligent display devices, particularly large-screen display devices, are used more and more frequently in life or work. Some intelligent display devices have multiple operating systems built therein, or multiple operating systems are built into different devices. At present, there is often a need to display contents of different operating systems on the same display screen. Taking screen transmission as an example, a screen content of a sending terminal (such as Windows, Mac or Chrome Notebook) with a built-in second operating system can be projected to a receiving terminal (such as a large-sized interactive white board) with a built-in first operating system. At this time, the first operating system may be referred to as a main operating system, and the second operating system may be referred to as an external-channel operating system. Taking a multi-system interactive white board as an example, a content of the second operating system (e.g., Windows system) in the interactive white board can be exhibited on a display interface of the first operating system (e.g., Android system).

It is found that when the content of the second operating system is exhibited on the display interface of the first operating system, a touch screen of the device where the first operating system is located must be in a specified horizontal or vertical state, otherwise, the second operating system cannot be controlled to respond by touching the touch screen of the first operating system.

SUMMARY

The present disclosure provides a touch data processing method, apparatus, device and storage medium.

According to a first aspect of embodiments of the present disclosure, a touch data processing method is provided. A first operating system and a second operating system are operating systems in a same device or in different devices. The method includes: displaying a display content from the second operating system on a display interface of the first operating system, wherein the display content is displayed in a target display area of the display interface of the first operating system, after a touch screen on a device where the first operating system is located is rotated by a preset angle, if a touch operation on the touch screen is detected, determining whether the touch operation is an operation on the display content in the target display area, and if yes, sending touch data corresponding to the touch operation to the second operating system, so that the second operating system responds to the touch operation.

According to a second aspect of embodiments of the present disclosure, a touch data processing method is provided. A first operating system and a second operating system are operating systems in a same device or in different devices. The method includes: displaying a display content from the second operating system on a display interface of the first operating system, wherein the display content is displayed in a target display area of the display interface of the first operating system, if a touch screen on a device where the first operating system is located is rotated by a preset angle, acquiring touch-position information, wherein the touch-position information is acquired by mapping position information of the target display area under a systematic coordinate system of the first operating system to a touch-box coordinate system of the first operating system, when a touch operation on the display interface of the first operating system is detected, according to a relationship between the touch operation and the touch-position information, determining whether the touch operation is an operation on the display content in the target display area, and if yes, sending touch data corresponding to the touch operation to the second operating system, so that the second operating system responds to the touch operation.

According to a third aspect of embodiments of the present disclosure, a touch data processing method is provided. A first operating system and a second operating system are operating systems in a same device or in different devices. The method includes: a device where the first operating system is located displays a display content from the second operating system on a display interface of the first operating system, wherein the display content is displayed in a target display area of the display interface of the first operating system, after a touch screen on a device where the first operating system is located is rotated by a preset angle, if a touch operation on the touch screen is detected, the device where the first operating system is located determines whether the touch operation is an operation on the display content in the target display area, if yes, touch data corresponding to the touch operation is sent to the second operating system, and a device where the second operating system is located responds to the touch operation according to received touch data.

According to a fourth aspect of embodiments of the present disclosure, a touch data processing apparatus is provided. A first operating system and a second operating system are operating systems in a same device or in different devices. The apparatus includes: a data display module, configured to display a display content from the second operating system on a display interface of the first operating system, wherein the display content is displayed in a target display area of the display interface of the first operating system, an operation determination module, configured to, after a touch screen on a device where the first operating system is located is rotated by a preset angle, if a touch operation on the touch screen is detected, determine whether the touch operation is an operation on the display content in the target display area, and a data processing module, configured to, if the touch operation is an operation on the display content in the target display area, send touch data corresponding to the touch operation to the second operating system, so that the second operating system responds to the touch operation.

According to a fifth aspect of embodiments of the present disclosure, a touch data processing apparatus is provided. A first operating system and a second operating system are operating systems in a same device or in different devices. The apparatus includes: a content display module, configured to display a display content from the second operating system on a display interface of the first operating system, wherein the display content is displayed in a target display area of the display interface of the first operating system, a position acquisition module, configured to acquire touch-position information, wherein the touch-position information is acquired by mapping position information of the target display area under a systematic coordinate system of the first operating system to the touch-box coordinate system of the first operating system, an operation determination module, configured to, when a touch operation on the display interface of the first operating system is detected, according to a relationship between the touch operation and the touch-position information, determine whether the touch operation is an operation on the display content in the target display area, and a data processing module, configured to, if the touch operation is an operation on the display content in the target display area, send the touch data corresponding to the touch operation to the second operating system, so that the second operating system responds to the touch operation.

According to a sixth aspect of embodiments of the present disclosure, a computer storage medium is provided. The computer storage medium stores a plurality of instructions, the instructions are adapted to be loaded by a processor and execute steps of any one of the above-mentioned touch data processing methods.

According to a seventh aspect of embodiments of the present disclosure, an electronic device is provided. The electronic device includes a memory and a processor, wherein the memory stores computer program, and the computer program is adapted to be loaded by the processor and executes steps of any one of the above-mentioned touch data processing methods.

The technical solutions provided by embodiments of the present disclosure may include the beneficial effects as follows.

In embodiments of the present disclosure, the display content from the second operating system is displayed on the display interface of the first operating system, and after the touch screen on the device where the first operating system is located is rotated by a preset angle, if the touch operation on the touch screen is detected, whether the touch operation is an operation on the display content in the target display area is determined. Thus, if the touch operation is an operation on the display content in the target display area, the touch data corresponding to the touch operation can be sent to the second operating system, so that the second operating system responds to the touch operation. The present disclosure realizes that even if the touch screen on the device where the first operating system is located is rotated, the second operating system can also be controlled to respond to the touch operation by touching the touch screen.

It should be understood that both the above general description and the following detailed description are exemplary and explanatory only and are not restrictive of the present disclosure.

BRIEF DESCRIPTION OF DRAWINGS

The accompanying drawings herein, which are incorporated in and constitute a part of this description, illustrate embodiments consistent with the present disclosure and are used to explain the principles of the present disclosure together with the description.

FIG. 3 is a flowchart of a touch data processing method according to an exemplary embodiment of the present disclosure.

FIG. 4 is a flowchart of another touch data processing method according to an exemplary embodiment of the present disclosure.

FIG. 5A is a flowchart of another touch data processing method according to an exemplary embodiment of the present disclosure.

FIG. 5D is a flowchart of determining touch-position information according to an exemplary embodiment of the present disclosure.

DETAILED DESCRIPTION

Exemplary embodiments will be described in detail herein, and examples thereof are shown in the accompanying drawings. When the following description refers to the accompanying drawings, unless otherwise indicated, the same numbers in different drawings represent the same or similar elements. The implementation approaches described in exemplary examples hereinafter are not intended to represent all implementation approaches consistent with the present disclosure. On the contrary, they are merely examples of apparatuses and methods consistent with some aspects of the present disclosure as recited in the appended claims.

The terms used in the present disclosure are for the purpose of describing particular embodiments only and is not intended to limit the present disclosure. The "a", "said" and "the" in singular form used in the present disclosure and the appended claims are also intended to include plural form, unless the context clearly indicates other meanings. It should also be understood that the term "and/or" as used in the present disclosure refers to and includes any or all possible combinations of one or more associated listed items.

It should be understood that, although the terms of first, second, third, etc. may be used in the present disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "while" or "when" or "in response to a certainty."

Figure 1:
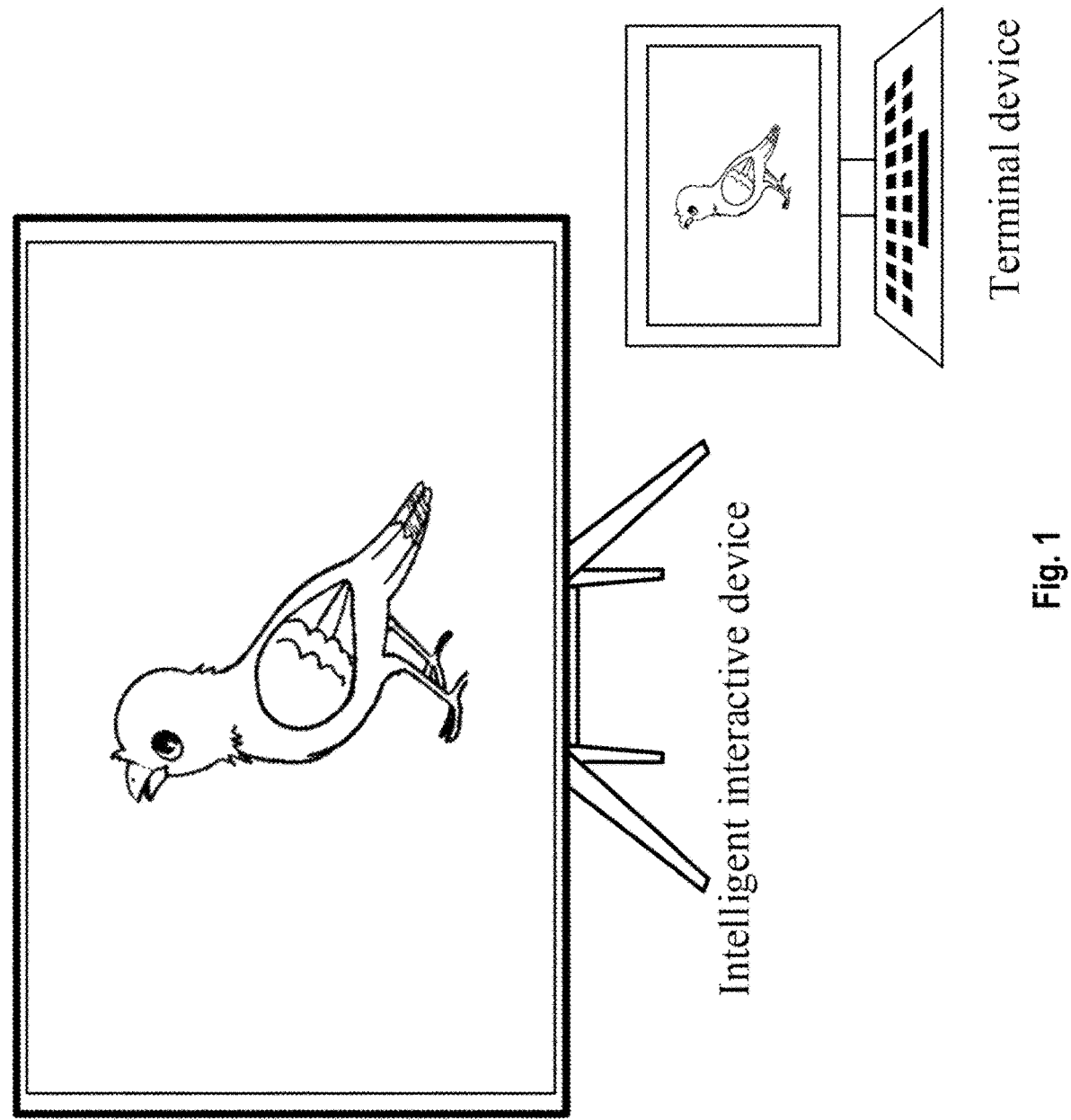
FIG. 1 is a schematic diagram of screen projection display in the related art.

Different operating systems can share a same display screen. Different operating systems may refer to a same type or different types of operating systems in a same device, or may refer to a same type or different types of operating systems located in different devices. Screen transmission belongs to a situation where different devices share a same display screen. In scenarios such as work, study, and entertainment, screen transmission operations are widely used to synchronize multimedia data of a source device to a target device, and the target device plays the contents. However, it is found that, when a content of a second operating system is exhibited on a display interface of a first operating system, a touch screen of a device where the first operating system is located must be in a specified horizontal or vertical state, so as to ensure that when touching the touch screen of the first operating system, the second operating system can respond accordingly. If the touch screen of the device where the first operating system is located is rotated, the second operating system cannot be controlled to respond by touching the touch screen. As shown in FIG. 1, it is a schematic diagram of screen projection display in the related art. In this schematic diagram, a terminal device serving as the source device can exhibit multimedia data on its screen on a screen of the intelligent interactive device (target device) in a full-screen manner. In a process of exhibiting the multimedia data of the terminal device by the intelligent interactive device, if the touch screen of the intelligent interactive device is rotated, the terminal device cannot be controlled to respond to the touch operation by touching the touch screen of the intelligent interactive device.

In view of this, the present disclosure provides a touch data processing method which realizes that: even if the touch screen on the device where the first operating system is located is rotated, the second operating system can be controlled to respond to the touch operation by touching the touch screen.

The touch data processing method provided in this embodiment may be executed by software, or by a combination of software and hardware, or by hardware. The involved hardware may be composed of two or more physical entities, or may be composed of one physical entity. The method of this embodiment can be applied to an electronic device with display and touch functions. Thereinto, the electronic device may be an intelligent display device such as an interactive white board and a digital tablet, or may be a tablet computer, notebook computer, desktop computer, Personal Digital Assistant (PDA) and other devices with display and touch functions.

As an example, an execution main body of the touch data processing method may be a processing module in an electronic device, or may be the first operating system. The first operating system and the second operating system may be two identical or different operating systems in the same device, or may be a same type or different types of operating systems located in different devices. The processing module may be a functional module different from the first operating system. For example, the first operating system corresponds to a set of modules (for example, including CPU, GPU, a processor, a memory, etc.), and the processing module herein may be a Microcontroller Unit (MCU) different from the set of modules. The electronic device may further include a touch data collection module and a display screen. For example, a touch operation interface of the touch data collection module may cover a display screen for detecting a touch operation and generating corresponding touch data. Hereinafter, a touch data processing method executed by a processing module is illustrated as an example.

Figure 2A:
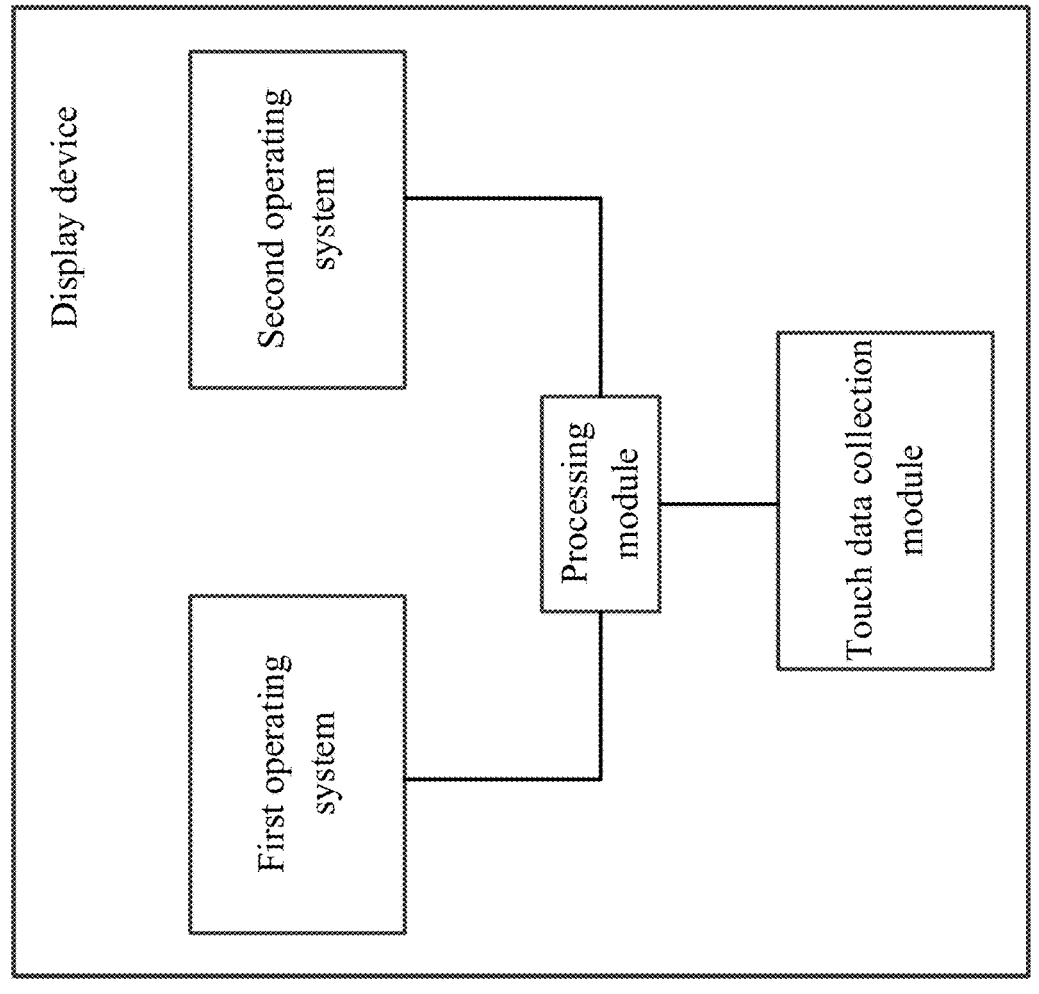
FIG. 2A is a schematic diagram of a device with a touch data processing method according to an exemplary embodiment of the present disclosure.

As shown in FIG. 2A, it is a schematic diagram of a device with a touch data processing method according to an exemplary embodiment of the present disclosure. In this schematic diagram, the first operating system and the second operating system can be a same operating system or different operating systems in the same device. Taking the display device as an interactive white board as an example, the first operating system can be Android system, and the second operating system can be Windows system. A touch data collection module can transmit collected touch data to a processing module, and the processing module determines whether the touch data is transmitted to the first operating system for response or to the second operating system for response.

Figure 2B:
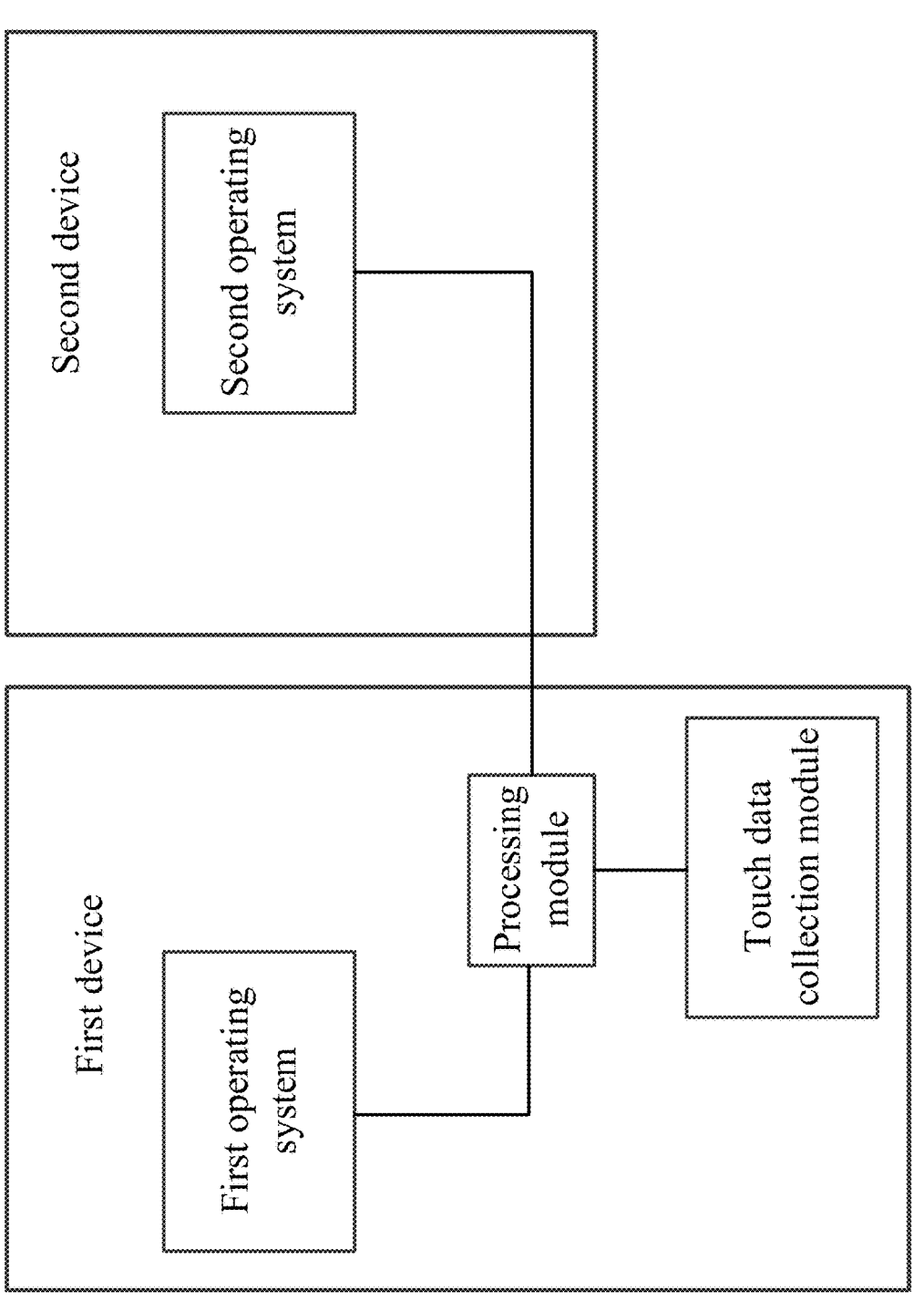
FIG. 2B is a schematic diagram of another device with a touch data processing method according to an exemplary embodiment of the present disclosure.

As shown in FIG. 2B, it is a schematic diagram of another device with the touch data processing method according to an exemplary embodiment of the present disclosure. In this diagram, the first operating system and the second operating system may be a same type or different types of operating systems located in different devices. A first device may be a display device with a touch display function, and the second device may be a smartphone, a tablet computer, a notebook computer, a desktop computer, and other devices that have screen projection requirements. The touch data collection module can transmit the collected touch data of the first device to the processing module, and the processing module determines whether the touch data is transmitted to the first operating system for response or to the second operating system for response.

In one embodiment, an interactive white board is used as an example for illustration. The execution main body of the embodiment of the present disclosure may be an interactive white board. Thereinto, the interactive white board, also referred as interactive intelligent tablet, can be an integrated device that controls a content displayed on a display panel and realizes human-computer interaction through touch technology. The integrated device integrates one or more functions such as a projector, an electronic whiteboard, a screen curtain, a sound box, TV and video conference terminal.

In one embodiment, the first operating system and the second operating system perform wired screen transmission. For example, there is no need to pre-install screen transmission software in the first operating system and the second operating system, the first operating system transmits touch data to the second operating system, and the second operating system can transmit the content to the first operating system through standard HDMI, so as to realize wired screen transmission.

Sequentially, the embodiments of the present disclosure will be explained as examples with reference to the accompanying drawings.

As shown in FIG. 3, it is a flowchart of a touch data processing method according to an exemplary embodiment of the present disclosure. The first operating system and the second operating system are operating systems in a same device or different devices, and the method includes:

in Step 302, displaying a display content from the second operating system on a display interface of the first operating system, wherein the display content is displayed in a target display area of the display interface of the first operating system, in Step 304, after a touch screen on a device where the first operating system is located is rotated by a preset angle, if a touch operation on the touch screen is detected, determining whether the touch operation is an operation on the display content in the target display area, in Step 306, if yes, sending touch data corresponding to the touch operation to the second operating system, so that the second operating system responds to the touch operation.

In embodiments of the present disclosure, the display content from the second operating system is displayed on the display interface of the first operating system, and after the touch screen on the device where the first operating system is located is rotated by a preset angle, if the touch operation on the touch screen is detected, whether the touch operation is an operation on the display content in the target display area is determined. Thus, if yes, the touch data corresponding to the touch operation can be sent to the second operating system, so that the second operating system responds to the touch operation. It is realized that even if the touch screen on the device where the first operating system is located is rotated, the second operating system can also be controlled to respond to the touch operation by touching the touch screen.

The method in the embodiment of the present disclosure may be executed by the device where the first operating system is located. For example, it may be executed by the first operating system, or may be executed by other processing modules different from the first operating system.

In one example, the target display area may be a full-screen area of the display interface of the first operating system. It is realized that in the case where the display interface of the first operating system exhibits the display content of the second operating system in full screen, even if the touch screen on the device where the first operating system is located is rotated, the second operating system can also be controlled to respond to a touch operation by touching the touch screen.

In some embodiments, when a content of any operating system is exhibited on the screen, it is exhibited in full screen, and the systems are mutually exclusive, and contents of two operating systems cannot be displayed on the screen at the same time. Taking FIG. 1 as an example, in a process of exhibiting the multimedia data of the terminal device by the intelligent interactive device, there may be a need to operate the content (such as application programs) in the operating system, while the application programs in the operating system of the intelligent interactive device cannot be operated since the multimedia data of the terminal device needs to be exhibited on the screen of the intelligent interactive device in full screen.

Based on this, in another embodiment, the target display area is defined as a partial area on the display interface of the first operating system. The partial area can also be called local area, or non-full-screen area. In this way, the display interface of the first operating system not only exhibits the content of the interface of the second operating system, but also exhibits the display content of the first operating system in other areas on the display interface of the first operation system since the content of the interface of the second operating system only occupies a partial area, that is, a non-full-screen area on the display interface of the first operating system. In one embodiment, in the case where the display content of the first operating system is exhibited in a non-full-screen area, if a touch operation on the touch screen of the first operating system is detected, it is also possible to judge whether the touch operation is an operation on the display content in the target display area, so as to determine whether to send the touch data corresponding to the touch operation to the second operating system, thereby realizing response of the second operating system to the touch operation.

In order to achieve the controllability of the target display area, in one embodiment, the display content of the second operating system is displayed on the display interface of the first operating system in a window display manner. The target display area is the area where the window is located. When the window is maximized, the target display area is a full-screen area, and when the window is shrunk, the target display area is a non-full-screen area. It can be seen that the display content of the second operating system can be exhibited in full screen or non-full screen on the display interface of the first operating system by zooming the window.

It should be noted that, in each embodiment, the target display area is not a specific or preset display area on the display interface of the first operating system, but can be understood as a display area which is in the display interface of the first operating system and displayed the display content from the second operating system.

In one embodiment, when the display content of the second operating system is displayed in the window of the display interface of the first operating system, if a touch operation on the touch screen of the first operating system is detected, whether the touch operation is an operation on the display content in the target display area is determined; if yes, the touch data corresponding to the touch operation is sent to the second operating system, so that the second operating system responds to the touch operation. It is realized that even if the content of the second operating system is exhibited on the display interface of the first operating system in a windowed form, it is also possible to support the touch data to be sent back to the second operating system, so that the second operating system can respond to the touch operation.

Normally, the touch screen on the device where the first operating system is located is a designated horizontal or vertical screen, and it can be considered that the touch screen is in a 0-degree state. Based on different needs, the user may rotate the touch screen by different preset angles. The preset angle may be an angle in a specified angle set, for example, the specified angle set includes: 90 degrees, 180 degrees, 270 degrees, 360 degrees, and the like. If supported by the device, the preset angle can also be any angle.

In some embodiments, a sensor with a motion detection function such as a gyroscope or an angle sensor may be equipped inside the device where the first operating system is located, and the first operating system can judge, by acquiring detection data of the sensor, whether the device rotates and the rotation angle, so that it is possible to determine whether the detected rotation angle of the device is a preset angle, and which preset angle in the specified angle set.

After the touch screen is rotated, regardless of whether the display content of the second operating system is exhibited in a partial area (non-full-screen area) or a window, if a touch operation on the touch screen is detected, whether the touch operation is an operation on the display content in the target display area can be determined; if yes, the touch data corresponding to the touch operation can be sent to the second operating system, so that the second operating system responds to the touch operation. As for how to judge whether the touch operation is an operation on the display content in the target display area, an example will be described in the following embodiments, and for brevity purpose, it will not be repeated herein.

In one embodiment, if the touch operation is an operation on the display content in the target display area, an updated display content will be displayed in the target display area.

In one example, the updated display content may be obtained by the second operating system updating the display content based on the touch operation. After the second operating system responds to the touch operation, a response result can be transmitted to the first operating system, and the updated display content can be displayed in the target display area of the first operating system.

In some embodiments, even if the touch operation is an operation on the display content in the target display area, in order to quickly exhibit the updated display content, not only the touch data corresponding to the touch operation is sent to the second operating system, so that the second operating system responds to the touch operation, but also the touch data corresponding to the touch operation can be sent to the first operating system, so that the first operating system directly responds to the touch operation. In view of this, in another example, the updated display content may be obtained by the first operating system updating the display content based on the touch operation, so that the update speed of the display content can be improved.

In some embodiments, a floating window and/or a control for controlling a display state of the target display area may be displayed in the target display area. The floating window may be a button for controlling the target display area, or a button for controlling the display interface of the first operating system, or the like. The display state of the target display area may be a size state of the area, a position state of the area, and the like. For example, the control may be a maximized control, a minimized control, a close control, etc., which is fixed in the target display area. A touch operation acting on the floating window and the control is responded to by the first operating system. In this way, the area where the floating window and the control are located can be used as a shielding area, and touch operation on the shielding area is not responded to by the second operating system.

Since the display position of the target display area may also be adjusted, based on this, in one embodiment, after a display position of the target display area is adjusted, if the touch operation is an operation on the display content in the adjusted target display area, the touch data of the touch operation is sent to the second operating system, so that the second operating system responds to the touch operation. Therefore, it is realized that even if the position of the target display area is changed, the second operating system can also respond to the touch operation.

Correspondingly, in order to facilitate understanding, the touch data processing method is also described from the perspective of interaction. As shown in FIG. 4, it is a flowchart of another touch data processing method according to an exemplary embodiment of the present disclosure. The first operating system and the second operating system are operating systems in the same device or different devices, and the methods includes:

in Step 402, a device where the first operating system is located displays a display content from the second operating system on a display interface of the first operating system, wherein the display content is displayed in a target display area of the display interface of the first operating system, in Step 404, after a touch screen on the device where the first operating system is located is rotated by a preset angle, if a touch operation on the touch screen is detected, the device where the first operating system is located determines whether the touch operation is an operation on the display content in the target display area; if yes, the device where the first operating system is located sends touch data corresponding to the touch operation to the second operating system, in Step 406, a device where the second operating system is located responds to the touch operation according to received touch data.

It should be understood that, the related technology in FIG. 4 is the same as that in FIG. 3, and for brevity purpose, details are not repeated herein.

It is realized that even if the touch screen on the device where the first operating system is located is rotated, the device where the second operating system is located can still respond to a touch operation on the device where the first operating system is located.

Sequentially, the touch data processing method will also be described from the perspective of how to realize that the second operating system can respond to the touch operation. As shown in FIG. 5A, it is a flowchart of another touch data processing method according to an exemplary embodiment of the present disclosure. The first operating system and the second operating system are operating systems in the same device or different devices, and the method includes:

in Step 502, displaying a display content from the second operating system on a display interface of the first operating system, wherein the display content is displayed in a target display area of the display interface of the first operating system, in Step 504, if a touch screen on a device where the first operating system is located is rotated by a preset angle, acquiring touch-position information, wherein the touch-position information is acquired by mapping position information of the target display area under a systematic coordinate system of the first operating system to a touch-box coordinate system of the first operating system, in Step 506, when a touch operation on the display interface of the first operating system is detected, according to a relationship between the touch operation and the touch-position information, determining whether the touch operation is an operation on the display content in the target display area, in Step 508, if yes, sending touch data corresponding to the touch operation to the second operating system, so that the second operating system responds to the touch operation.

In this embodiment, in order that the second operating system can also respond to the touch operation on the touch screen of the first operating system in the case of exhibiting the display content of the second operating system in the target display area, the first operating system or other processing modules different from the first operating system can acquire touch-position information, and when detecting a touch operation on the display interface of the first operating system, according to the relationship between the touch operation and the touch-position information, whether the touch operation is an operation on the display content in the target display area is determined, so as to determine whether to send the touch data corresponding to the touch operation to the second operating system, so that the second operating system can also respond to the touch operation on the touch screen of the first operating system.

The method of this embodiment may be executed by the device where the first operating system is located. For example, it may be executed by the first operating system, or may be executed by other processing modules different from the first operating system, or the like. For example, the method of this embodiment can be applied to the processing module in FIG. 2A or FIG. 2B.

Regarding displaying the display content from the second operating system on the display interface of the first operating system, in one example, the full-screen content of the second operating system can be displayed in the target display area of the display interface of the first operating system, so as to achieve display of the content in the second operating system as much as possible.

In another example, a part of the screen content of the second operating system may be displayed in the target display area of the display interface of the first operating system, so as to cope with some special scenarios, thereby making the content of the screen projection more flexible. For example, it is expected that the display interface of the first operating system exhibits first information (such as non-private information) in the second operating system, but it is not expected that the display interface of the first operating system exhibits second information (such as private information) in the second operating system. In this way, the screen of the second operating system can be divided into at least two areas, one area exhibits the first information, the other area exhibits the second information, and the first information is projected and exhibited in the target display area of the display interface of the first operating system. For example, the screen of the second operating system can be divided into two on the left and right, and only the content exhibited in the left area is displayed on the first operating system, and the content exhibited in the right area is not displayed on the display interface of the first operating system. It should be understood that the content of which partial area in the second operating system is specifically exhibited can be flexibly configured, and is not limited to the left and right sides, which is not limited herein.

Regarding the target display area, in one example, the target display area may be a full-screen area of the display interface of the first operating system. In the case where the display interface of the first operating system exhibits the display content of the second operating system in full screen, the second operating system can also be controlled to respond to the touch operation by touching the touch screen.

In some embodiments, when a content of any operating system is exhibited on the screen, it is exhibited in full screen, and the systems are mutually exclusive, and contents of two operating systems cannot be displayed on the screen at the same time. Based on this, in another embodiment, the target display area is defined as a partial area in the display interface of the first operating system. The partial area can also be called local area, or non-full-screen area. In this way, the display interface of the first operating system not only exhibits the content of the interface of the second operating system, but also exhibits the display content of the first operating system in other areas of the display interface of the first operation system since the content of the interface of the second operating system only occupies a partial area on the display interface of the first operating system. Moreover, in the case where the display content of the first operating system is exhibited in a non-full-screen area, if a touch operation on the touch screen of the first operating system is detected, it is also possible to judge whether the touch operation is an operation on the display content in the target display area, so as to determine whether to send the touch data corresponding to the touch operation to the second operating system, thereby realizing response of the second operating system to the touch operation.

In order to achieve the controllability of the target display area, in one embodiment, the display content of the second operating system is displayed on the display interface of the first operating system in a window display manner. The target display area is an area where the window is located. When the window is maximized, the target display area is a full-screen area, and when the window is shrunk, the target display area is a non-full-screen area. It can be seen that, by zooming the window, the display content of the second operating system can be exhibited in full screen or non-full screen on the display interface of the first operating system.

Regarding how to exhibit the display content of the second operating system on the display interface of the first operating system in a windowed form, for example, it may be to encode picture signals of the second operating system into a video data stream, and transmit the video data stream to the first operating system through HDMI/Type/VGA, etc. After the first operating system obtains data, the data stream is decoded, and then zoomed and displayed on the window. It should be understood that other manners are also feasible, which will not be repeated herein.

In order to achieve reasonable distribution of touch data, when a touch operation on the display interface of the first operating system is detected in this embodiment, whether the touch operation is an operation on the display content in the target display area can be used to determine whether to send the touch data to the second operating system for response. Since the touch data is data under the touch-box coordinate system, in order to achieve comparability, this embodiment first obtains the touch-position information. The touch-position information is the position information of the target display area under the touch-box coordinate system, which can be obtained by mapping the position information of the target display area under the systematic coordinate system of the first operating system to the touch-box coordinate system of the first operating system. Since the position information of the target display area under the systematic coordinate system of the first operating system can be acquired through a system interface, for the convenience of distinction, the position information is simply referred to as system-position information, and the touch data is the data under the touch-box coordinate system, and thus, the position information of the target display area under the touch-box coordinate system of the first operating system, which is referred to as touch-position information, may be determined by the relationship between the touch-box coordinate system and the systematic coordinate system. In this way, it is possible to solve the problem of not knowing how to make the second operating system respond to the touch operation when the display content of the second operating system is displayed in the target display area of the display interface of the first operating system.

Regarding the main body for calculating the touch-position information, in one example, if the touch data processing method is executed by the first operating system, the first operating system can determine the touch-position information. In another example, if the touch data processing method is executed by other processing modules different from the first operating system, the first operating system may send the data required for calculating the touch-position information to the processing module, and the processing module will perform the calculation. The touch-position information can also be determined by the first operating system and sent to the processing module. Since original data of the touch box is reported at a high frequency, calculating the touch-position information through the first operating system can avoid the situation that the processing module cannot keep up with the efficiency and performance due to the low computing capability.

Regarding timing of updating the touch-position information, in one example, the touch-position information is updated after the display position of the target display area is adjusted, so as to ensure that the touch data can be correctly allocated and responded. The adjustment of the display position of the target display area may be an adjustment that causes change of the touch-position information, for example, one or more operations in which the target display area is moved, zoomed, region maximized, region minimized, region closed, etc. Particularly, when the display content is displayed on the display interface of the first operating system in a window display manner, the touch-position information may change with a window state. The adjustment of the display position of the target display area may be an operation on a container of the content of the second operating system. On Android system, the container can be SurfaceView, and controlling the drag/zoom of the window can control the position of SurfaceView.

It should be understood that other operations are also feasible, as long as the operation causes a change of the touch-position information, which will not be repeated herein.

As for how to determine the touch-position information, for example, it may be determined by the relationship between the touch-box coordinate system of the first operating system and the systematic coordinate system of the first operating system. The relationship between the touch-box coordinate system and the systematic coordinate system may include a conversion relationship between a position of an area under the touch-box coordinate system and a position of an area under the systematic coordinate system.

Figure 5B:
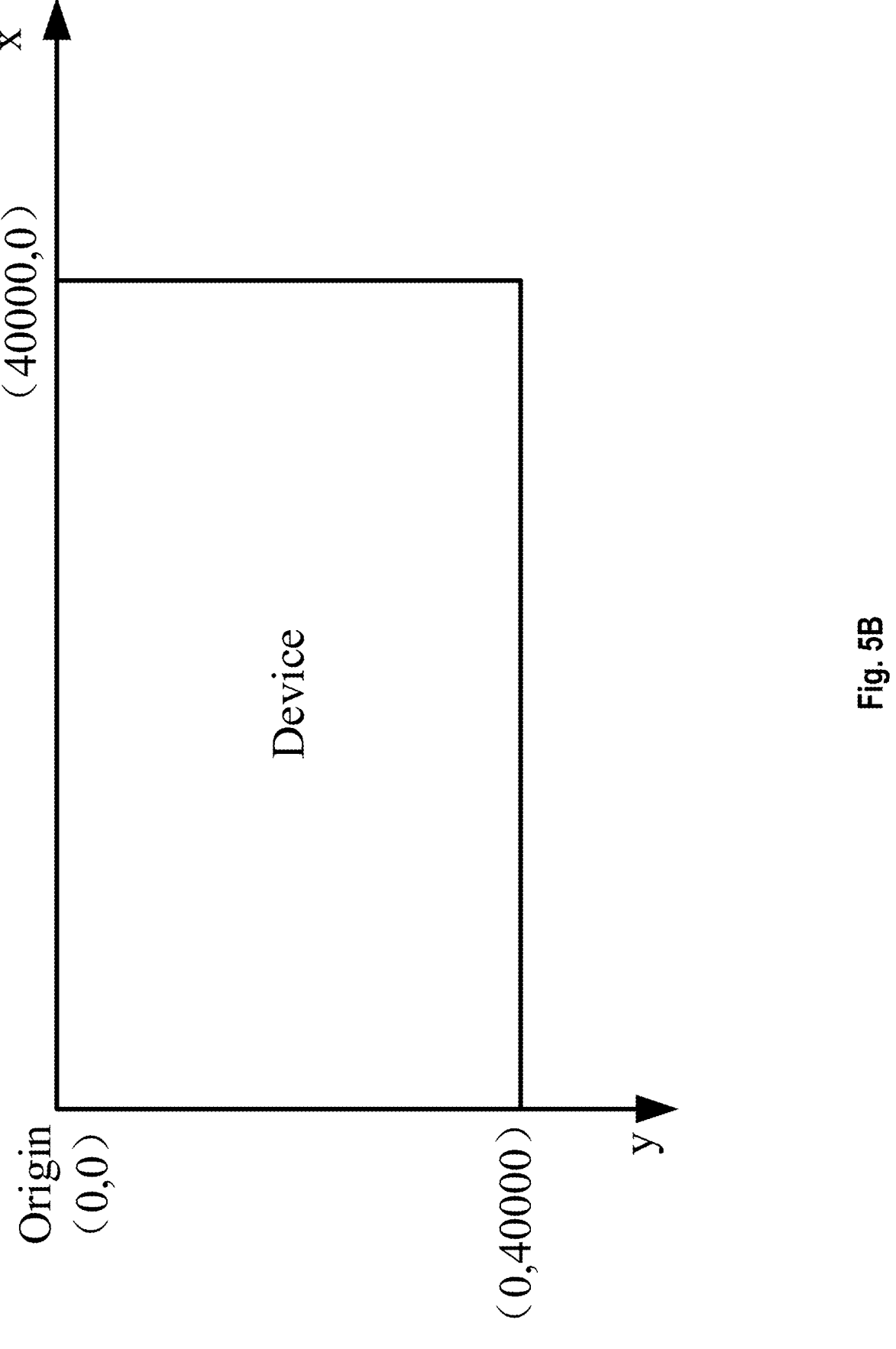
FIG. 5B is a schematic diagram of a touch-box coordinate system according to an exemplary embodiment of the present disclosure.
Figure 5C:
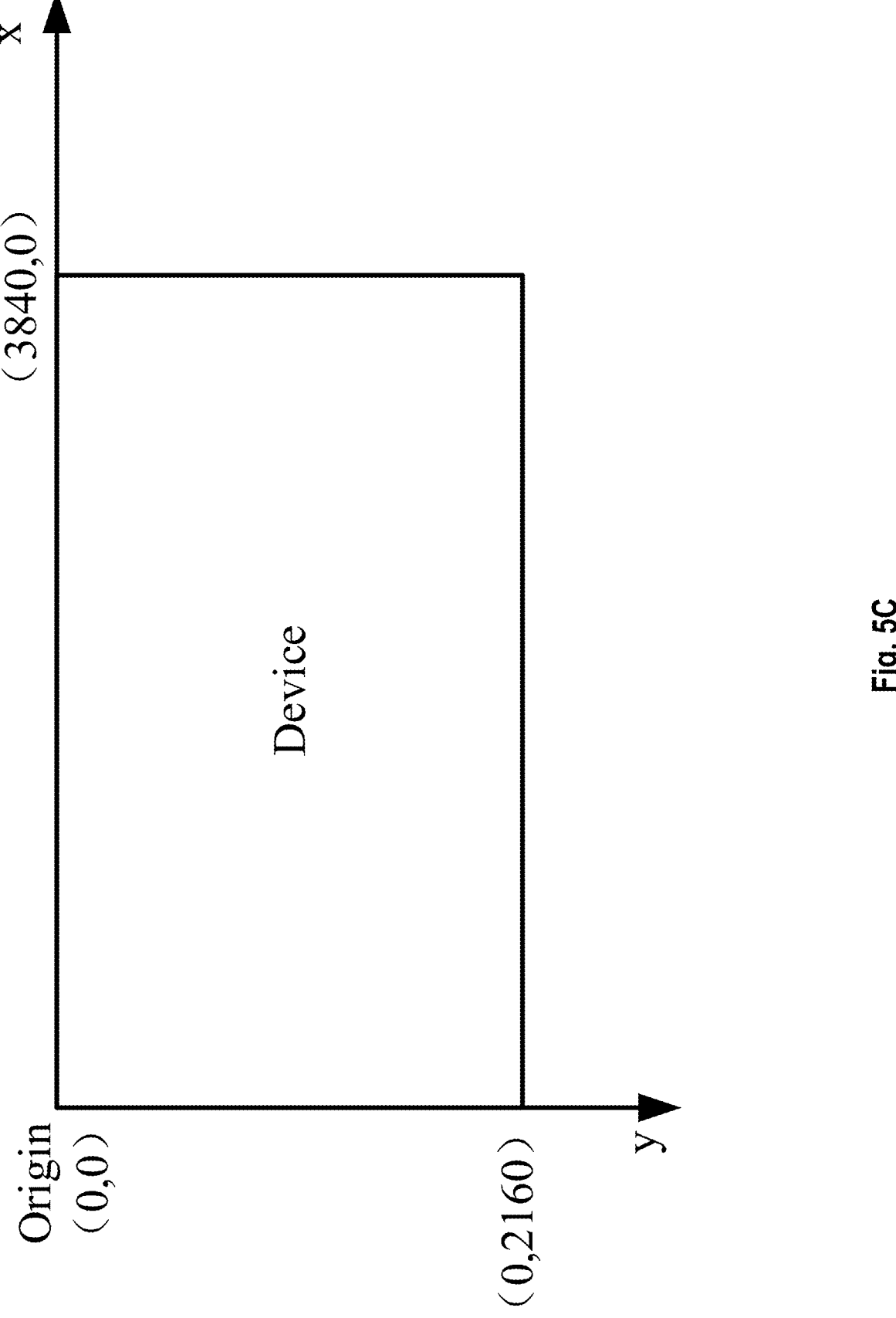
FIG. 5C is a schematic diagram of a screen coordinate system according to an exemplary embodiment of the present disclosure.

A width and height of the touch-box coordinate system depend on a precision of the touch screen. For example, if the X-axis precision of the touch box is 0-40000 and the Y-axis precision is 0-40000, the touch-box coordinate system can be as shown in FIG. 5B. A width and height of the systematic coordinate system depend on a resolution of the screen, and the systematic coordinate system is determined by an orientation of the system, wherein the orientation of the system can be determined by a rotation direction of the device. A width and height of the screen coordinate system depend on the resolution of the screen, the screen coordinate system is fixed, and the origin will not change with a rotation of the device. For example, a 4 k screen has a width of 3840 and a height of 2160, and the screen coordinate system is shown in FIG. 5C. Based on this, in an example, the preset relationship between the touch-box coordinate system and the systematic coordinate system may include: the preset relationship between the systematic coordinate system and the screen coordinate system, and the preset relationship between the screen coordinate system and the touch-box coordinate system.

Thereinto, the preset relationship between the systematic coordinate system and the screen coordinate system may include: a conversion relationship between the position of the area under the systematic coordinate system of the first operating system and the position of the area under the screen coordinate system of the first operating system. The preset relationship between the screen coordinate system and the touch-box coordinate system may include: a conversion relationship between the position of the area under the screen coordinate system of the first operating system and the position of the area under the touch-box coordinate system of the first operating system.

In this embodiment, the relationship between the touch-box coordinate system and the systematic coordinate system is determined through the relationship between the systematic coordinate system and the screen coordinate system, and the relationship between the screen coordinate system and the touch-box coordinate system, which can improve an accuracy of position conversion.

As shown in FIG. 5D, it is a flowchart of determining touch-position information according to an exemplary embodiment of the present disclosure. The method describes how to determine touch-position information based on the above-mentioned embodiment. The method can include the following steps 5001 to 5003:

in Step 5001, acquiring system-position information of the target display area under the systematic coordinate system of the first operating system through a system interface, in Step 5002, according to a preset relationship between a systematic coordinate system and a screen coordinate system, acquiring screen-position information of the target display area under a screen coordinate system of the first operating system by mapping the system-position information, in Step 5003, according to a preset relationship between the screen coordinate system and a touch-box coordinate system, acquiring the touch-position information of the target display area in the touch-box coordinate system of the first operating system by mapping the screen-position information.

It can be understood that, for the convenience of distinction, the position information of the target display area under different coordinate systems is named as different names. For example, the position information of the target display area in the systematic coordinate system of the first operating system is called system-position information, the position information of the target display area in the screen coordinate system of the first operating system is called screen-position information, and the position information of the display area in the touch-box coordinate system of the first operating system is called touch-position information.

Figure 5E:
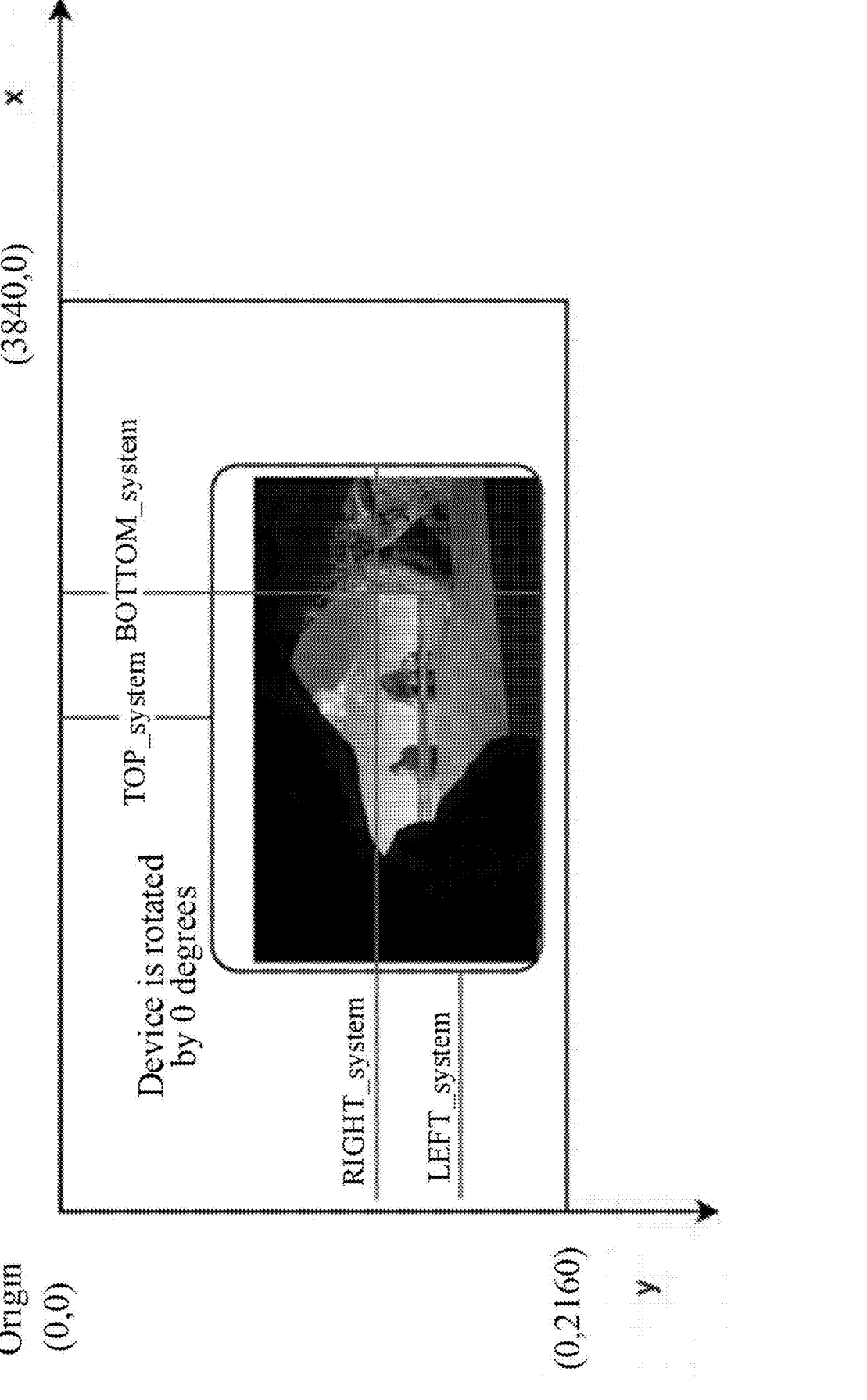
FIG. 5E is a schematic diagram of system-position information according to an exemplary embodiment of the present disclosure.

In this embodiment, system-position information can be acquired through a system interface. For example, the coordinates getX( ) and getY( ) where the target display area is located can be acquired, and the height getHeight( ) and width getWidth( ) of the target display area can be acquired. Then, as shown in FIG. 5E, it is a schematic diagram of system-position information according to an exemplary embodiment of the present disclosure. Assuming that the system-position information is represented by LEFT_system, TOP_system, RIGHT_system, and BOTTOM_system of the target display area, then:

LEFT_system=getX( )
TOP_system=getY( )
RIGHT_system=getX( )+getWidth( )
BOTTOM_system=getY( )+getHeight( )

Figure 5F:
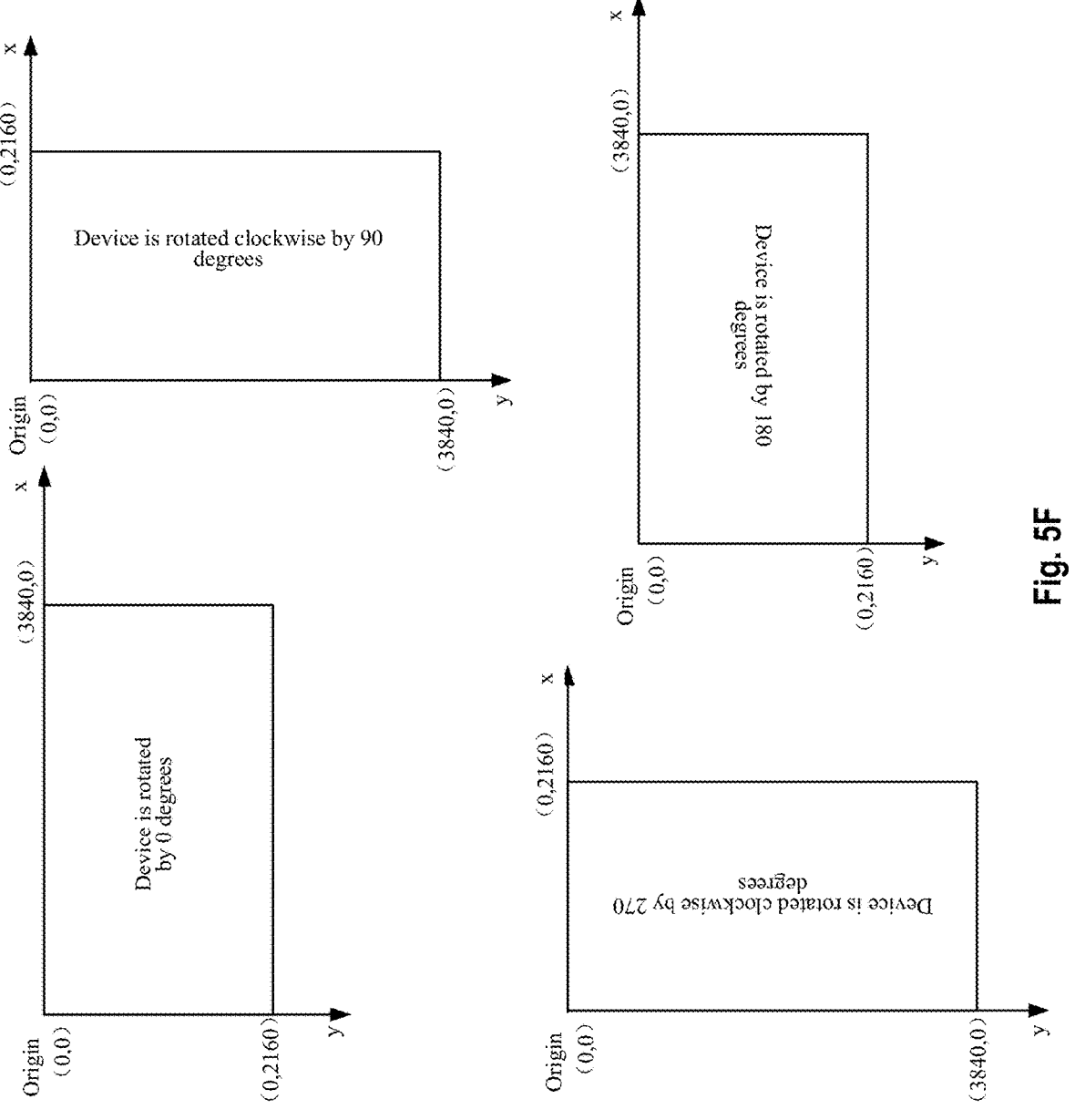
FIG. 5F is a schematic diagram of a systematic coordinate system after a device is rotated by 0 degrees, 90 degrees, 180 degrees, and 270 degrees according to an exemplary embodiment of the present disclosure.

Since the origin of the coordinate system of the system will change with a rotation of the device, the systematic coordinate system will change after the device is rotated. It will be described by taking the device being rotated by 0 degrees, 90 degrees, 180 degrees, and 270 degrees as examples. The relationship between the systematic coordinate system and the screen coordinate system includes: the relationship between the systematic coordinate system and the screen coordinate system after the touch screen is rotated by a specified angle in a specified direction. Thereinto, the specified angle includes 0 degrees, 90 degrees, 180 degrees and 270 degrees. As shown in FIG. 5F, it shows a 4 k system, which is a systematic coordinate system shown in four rotation directions. In order to acquire touch-position information, when the display content of the second operating system is displayed in the target display area of the display interface of the first operating system, the target display area may be first mapped from the systematic coordinate system to the screen coordinate system.

When the device is not rotated, that is, when the device is rotated by 0 degrees, the screen coordinate system is equal to the systematic coordinate system. Therefore, screen-position information (LEFT_screen, TOP_screen, RIGHT_screen, BOTTOM_screen) is system-position information (LEFT_system, TOP_system, RIGHT_system, BOTTOM_system).

Figure 5G:
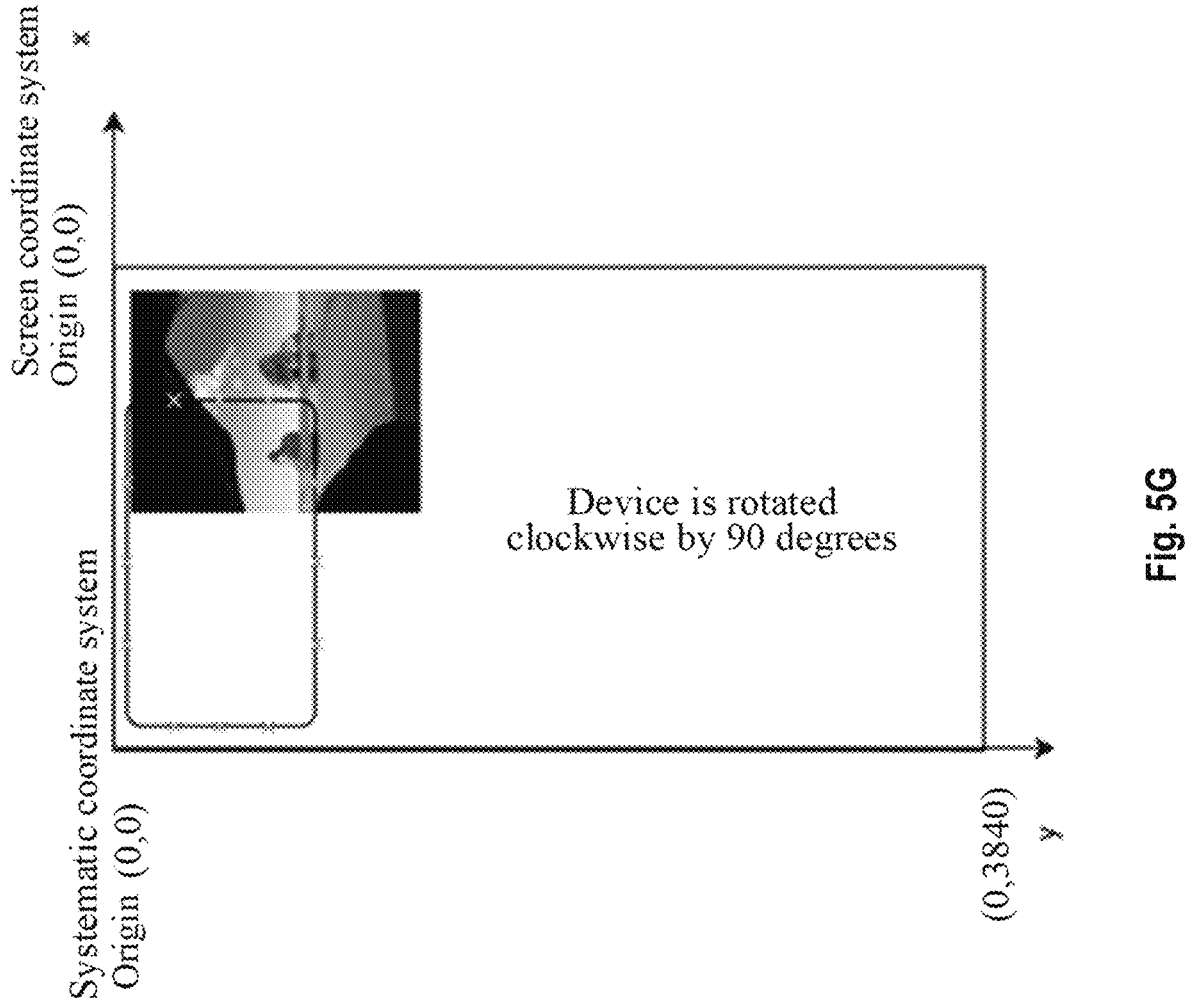
FIG. 5G is a schematic diagram showing a comparison of target display areas under different coordinate systems after a device is rotated clockwise by 90 degrees according to an exemplary embodiment of the present disclosure.
Figure 5H:
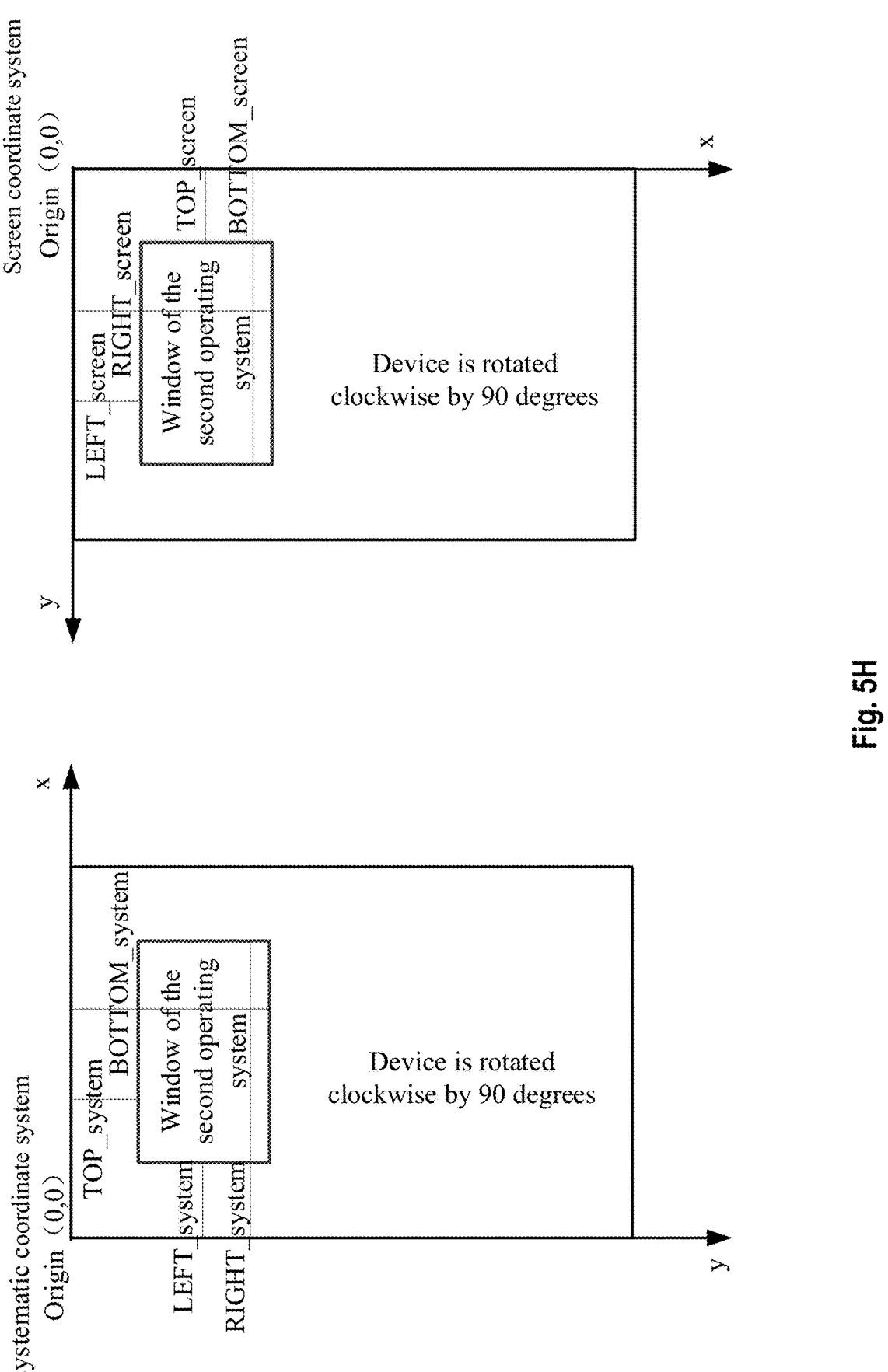
FIG. 5H is a schematic diagram showing a comparison between system-position information and screen-position information after a device is rotated by 90 degrees according to an exemplary embodiment of the present disclosure.

When the device is rotated clockwise by 90 degrees, the systematic coordinate system is rotated counterclockwise by 90 degrees relative to the screen coordinate system, and as a result, the systematic coordinate system is not equal to the screen coordinate system. As shown in FIG. 5G, it is a schematic diagram showing a comparison of target display areas in different coordinate systems after the device is rotated clockwise by 90 degrees according to an exemplary embodiment of the present disclosure. If the system-position information is still used as the screen-position information, the error shown in FIG. 5G will appear. In order to solve the above errors, the screen-position information of the target display area in the screen coordinate system of the first operating system is acquired by mapping the system-position information. As shown in FIG. 5H, the screen-position information (LEFT_screen, TOP_screen, RIGHT_screen, BOTTOM_screen) can be:

LEFT_screen=TOP_system
TOP_screen=ScreenWidth'−RIGHT_system
RIGHT_screen=BOTTOM_system
BOTTOM_screen=ScreenWidth'−LEFT_system wherein ScreenWidth' is a width of the screen when the screen is in a vertical state. For example, a screen resolution is 3840*2160. When the screen is in a vertical state, the screen has a width of 2160, and when the screen is a horizontal state, the screen is a width of 3840.

Figure 5I:
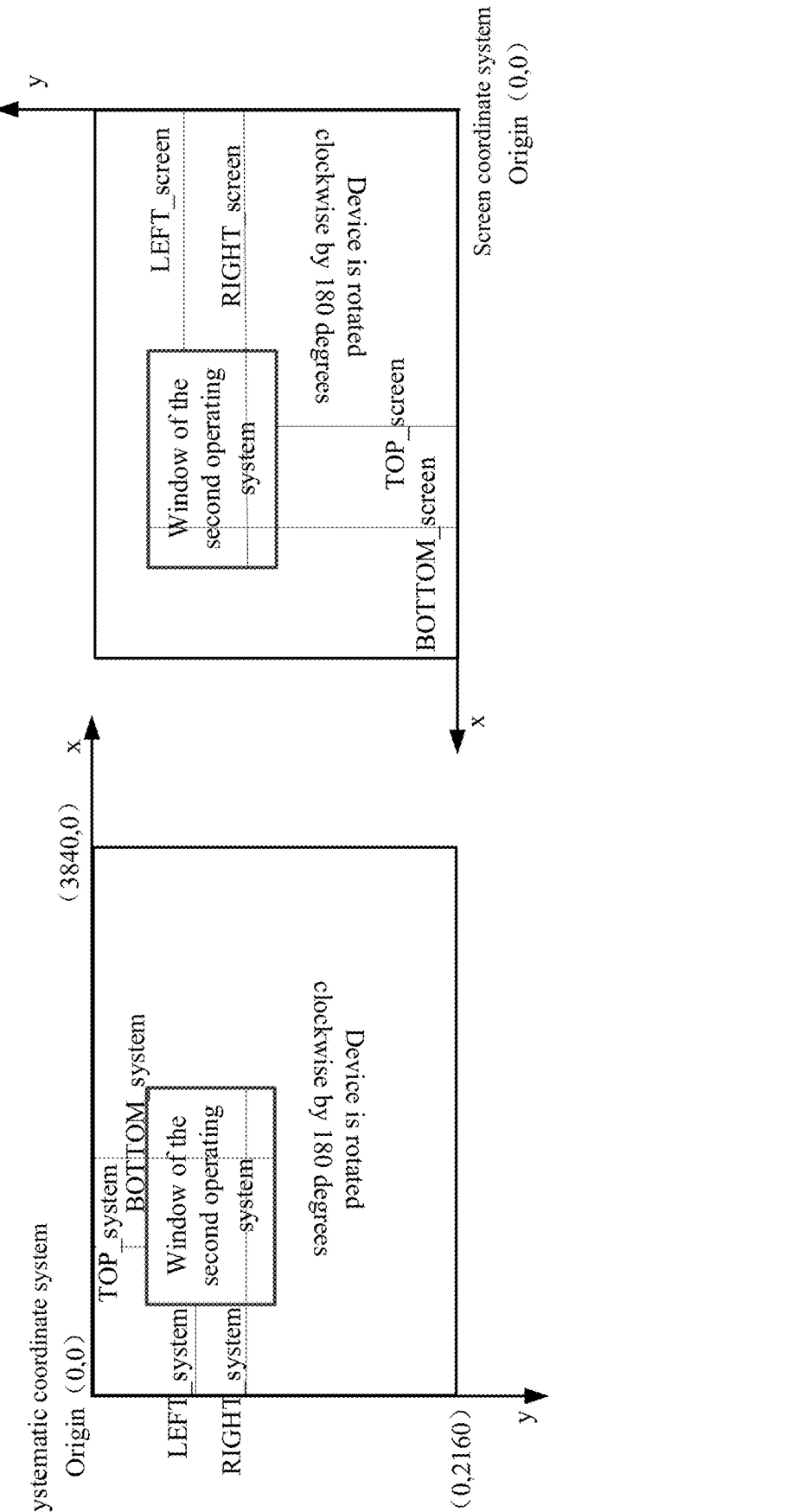
FIG. 5I is a schematic diagram showing a comparison between system-position information and screen-position information after a device is rotated by 180 degrees according to an exemplary embodiment of the present disclosure.

When the device is rotated clockwise by 180 degrees, the systematic coordinate system is rotated counterclockwise by 180 degrees relative to the screen coordinate system, and as a result, the systematic coordinate system is not equal to the screen coordinate system. The screen-position information of the target display area in the screen coordinate system of the first operating system is acquired by mapping the system-position information. As shown in FIG. 5I, screen-position information (LEFT_screen, TOP_screen, RIGHT_screen, BOTTOM_screen) can be:

LEFT_screen=ScreenWidth−RIGHT_system
TOP_screen=ScreenHeight−BOTTOM_system
RIGHT_screen=ScreenWidth−LEFT_system
BOTTOM_screen=ScreenHeight−TOP_system
wherein ScreenWidth is a width of the screen when the screen is in a horizontal state, and ScreenHeight is a height of the screen when the screen is in a horizontal state.

Figure 5J:
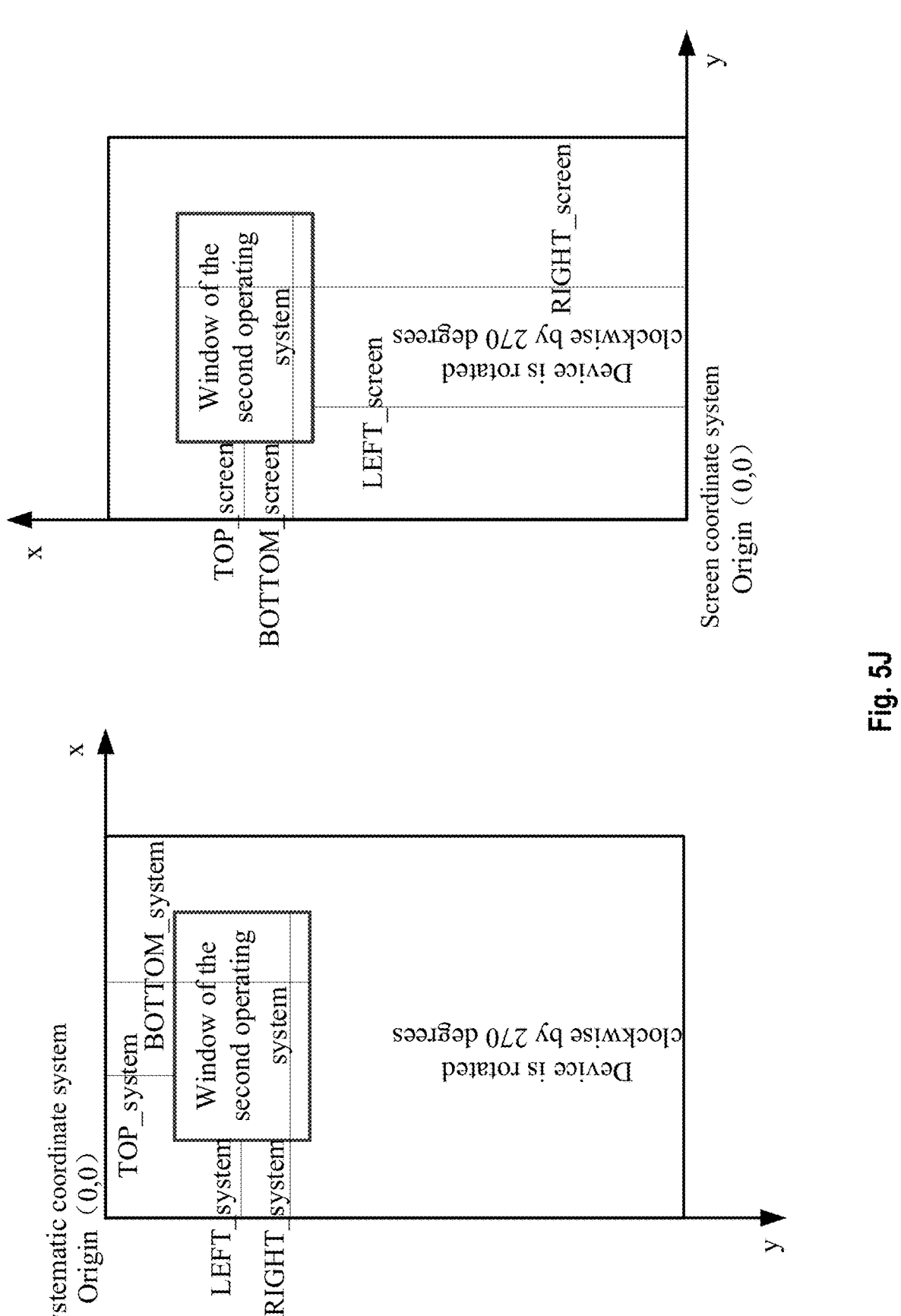
FIG. 5J is a schematic diagram showing a comparison between system-position information and screen-position information after a device is rotated by 270 degrees according to an exemplary embodiment of the present disclosure.

When the device is rotated clockwise by 270 degrees, the systematic coordinate system is rotated counterclockwise by 270 degrees relative to the screen coordinate system, and as a result, the systematic coordinate system is not equal to the screen coordinate system. The screen-position information of the target display area in the screen coordinate system of the first operating system is acquired by mapping the system-position information. As shown in FIG. 5J, screen-position information (LEFT_screen, TOP_screen, RIGHT_screen, BOTTOM_screen) can be:

LEFT_screen=ScreenHeight'−BOTTOM_system
TOP_screen=LEFT_system
RIGHT_screen=ScreenHeight'−TOP_system
BOTTOM_screen=RIGHT_system
wherein ScreenHeight' is a height of the screen when the screen is in a vertical state.

The display content of the second operating system is displayed in the target display area of the display interface of the first operating system. If touch is to be realized, the position information of the target display area under the screen coordinate system can be mapped to the position information under the touch-box coordinate system. Defining the touch accuracy of the X axis as TOUCH_X and the touch accuracy of the Y axis as TOUCH_Y, since the screen coordinate system and the touch coordinate system are coincident, there is a proportional relationship:

LEFT_touch/TOUCH_X=LEFT_screen/ScreenWidth
TOP_touch/TOUCH_Y=TOP_screen/ScreenHeight
RIGHT_touch/TOUCH_X=RIGHT_screen/ScreenWidth
BOTTOM_touch/TOUCH_Y=BOTTOM_screen/
ScreenHeight
That is,
LEFT_touch=LEFT_screen*TOUCHX/ScreenWidth
TOP_touch=TOP_screen*TOUCH_Y/ScreenHeight
RIGHT_touch=RIGHT_screen*TOUCH_X/
ScreenWidth
BOTTOM_touch=BOTTOM_screen*TOUCH_Y/
ScreenHeight
Correspondingly, the conversion relationship between the touch-position information and the system-position information can be acquired, and the system-position information can be acquired from the coordinates getX( ) and getY( )

where the target display area is located, and the height getHeight( ) and width getWidth( ) of the target display area. Thus, the conversion relationship between the touch-position information and getX( ), getY( ), getHeight( ) and getWidth( ) can be acquired.

It will be described still by taking the device being rotated by 0 degrees, 90 degrees, 180 degrees, and 270 degrees as examples.

When the device is not rotated, that is, rotated by 0 degrees, the conversion relationship between the touch-position information and getX( ), getY( ), getHeight( ) and getWidth( ) is:

LEFT_touch=getX( )*TOUCH_X/ScreenWidth
TOP_touch=getY( )*TOUCH_Y/ScreenHeight
RIGHT_touch=(getX(    )+getWidth(    ))*TOUCH_X/ScreenWidth
BOTTOM_touch=(getY(   )+getHeight(   ))*TOUCH_Y/ScreenHeight When the device is rotated clockwise by 90 degrees, the conversion relationship between the touch-position information and getX( ), getY( ), getHeight( ) and getWidth( ) is:

LEFT_touch=getY( )*TOUCH_X/ScreenWidth
TOP_touch=(ScreenWidth'–getX(    )–getWidth(    )*TOUCH_Y/ScreenHeight
RIGHT_touch=(getY(   )+getHeight(   ))*TOUCH_X/ScreenWidth
BOTTOM_touch=(ScreenWidth'–getX(   ))*TOUCH_Y/ScreenHeight When the device is rotated clockwise by 180 degrees, the conversion relationship between the touch-position information and getX( ), getY( ), getHeight( ) and getWidth( ) is:

LEFT_touch=(ScreenWidth–getX(    )–getWidth(    )*TOUCHX/ScreenWidth
TOP_touch=(ScreenHeight–getY(    )–getHeight(    )*TOUCH_Y/ScreenHeight
RIGHT_touch=(ScreenWidth–getX(        ))*TOUCH_X/ScreenWidth
BOTTOM_touch=(ScreenHeight–getY(    ))*TOUCHY/ScreenHeight When the device is rotated clockwise by 270 degrees, the conversion relationship between the touch-position information and getX( ), getY( ), getHeight( ) and getWidth( ) is:

LEFT_touch=(ScreenHeight'–getY(    )–getHeight(    )*TOUCH_X/ScreenWidth
TOP_touch=getX( )*TOUCHY/ScreenHeight
RIGHT_touch=(ScreenHeight'–getY(        ))*TOUCH_X/ScreenWidth
BOTTOM_touch=(getX(   )+getWidth(   )*TOUCH_Y/ScreenHeight Thus, the touch-position information can be acquired.

After the touch-position information is acquired, if a touch operation on the display interface of the first operating system is detected, according to the relationship between the touch operation and the touch-position information, whether the touch operation is an operation on the display content in the target display area can be determined, so that whether to send the touch data corresponding to the touch operation to the second operating system can be determined according to the judgment result, so that the second operating system can respond to the touch operation.

It should be understood that, in addition to the position information of the touch point, the touch data may further include ID of the touch point, the touch state of the touch point, and the like, which is not limited herein.

Regarding a condition of judging that the touch operation is an operation on the display content in the target display area, in one embodiment, the judgment condition may include that the touch operation is an operation on the target display area.

However, in some scenarios, there may also be a touch area in the target display area that is only for the response of the first operating system. For example, a floating window and/or a control for controlling a display state of the target display area may be displayed in the target display area. The floating window may be a button for controlling the target display area, or a button for controlling the display interface of the first operating system, or the like. The display state of the target display area may be a size state of the area, a position state of the area, and the like. For example, the control may be a control that is fixed in the target display area, such as a maximized control, a minimized control, or a close control. Touch operations acting on the floating window and the control are responded to by the first operating system. In this way, the area where the floating window and the control are located can be used as a shielding area, and touch operation on the shielding area is not responded to by the second operating system.

Figure 5K:
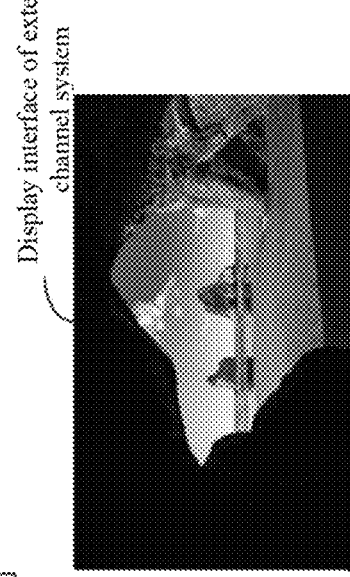
FIG. 5K is a schematic diagram that shows a window provided with a floating window according to an exemplary embodiment of the present disclosure.

As shown in FIG. 5K, it is a schematic diagram that shows a window provided with a floating window according to an exemplary embodiment of the present disclosure. The schematic diagram takes the first operating system as Android main system and the second system as an external channel system as an example, the display content of the external channel system is exhibited in the window of Android main system, and a close button is floated on the window. It is expected that when the user clicks the button, a touch event is given to Android main system, not to other external channel systems. The user can click the close button on the display interface of Android main system, so as to close the above-mentioned window, and does not expect that the external channel system responds to the touch data.

For this scenario, the condition of judging that the touch operation is an operation on the display content in the target display area includes: the touch operation is an operation on the target display area, and is not an operation on the shielding area. The shielding area is an area where the floating window is located and/or an area where the control for controlling the display state of the target display area is located in the target display area.

Thereinto, the shielding area may be one area or multiple areas, which are specifically configured according to requirements. How to determine the position information of the shield area is similar to how to acquire the touch-position information. The shield area is also an area under the touch-box coordinate system, which can be determined based on the relationship between the touch-box coordinate system and the systematic coordinate system. The shielding area may be calculated by the first operating system, or may be calculated by a processing module different from the first operating system. For the specific determination method, reference may be made to the determination method of the touch-position information, which will not be repeated herein.

This embodiment uses two sub-conditions to define whether the touch operation is an operation on the display content in the target display area, which can deal with the situation where it is expected that the first operating system responds to the touch operation in the target display area while it is not expected that the second operating system responds to the touch operation in the target display area.

It should be understood that the condition of judging whether the touch operation is an operation on the display content in the target display area may also include other conditions, which are configured according to requirements, and will not be repeated herein.

Regarding how to judge whether the touch operation is an operation on the target display area, in an example, the judgement can be made according to whether the position of the touch operation is inside the target display area. In another example, the judgement process may: when detecting that a touch object performs a touch-down event, a touch position of the touch object is inside the target display area. The touch-down event is an event that occurs during the touch object performs a continuous touch operation.

In some embodiments, a complete touch operation performed by the touch object may be continuous, which may often include: a touch-down event (ACTION_DOWN), multiple continuous touch-move events (ACTION_MOVE), and a touch-up event (ACTION_UP). During the process of one continuous touch operation, the touch position of the touch object changes and corresponds to multiple touch positions. These touch positions refer to positions of the touch points on the screen generated by the touch object in the process of touching and moving on the screen of the device. The touch object may be an operating body that can be recognized by the screen, such as a finger, a palm, or a stylus. In this example, as long as the touch-down event occurs in the target display area, it can be considered that all the current continuous touch operations are operations on the target display area. In other words, whether the current touch operation is an operation on the target display area may be determined by: whether the touch position of the touch object is inside the target display area when the touch object performs a touch-down event. If the touch position of the touch object is inside the target display area when the touch object performs a touch-down event, it is determined that the current touch operation is an operation on the target display area. Thereinto, the touch data may be touch data when a touch-down event, a touch-move event or a touch-up event of the same touch object is detected. In this way, the integrity of one continuous touch operation can be guaranteed.

Regarding whether the touch data is sent to the first operating system, in one embodiment, if the touch operation is not an operation on the display content in the target display area, the touch data of the touch operation is sent to the first operation system, and the first operating system responds to the touch operation, so that it is realized that the first operating system responds to the current touch operation when the touch operation is not an operation on the display content in the target display area. Thereby, it is realized that a piece of touch data is either sent to the first operating system for response, or sent to the second operating system for response. The touch operation which is not an operation on the display content in the target display area may be a touch operation which is not an operation on the target display area, or a touch operation which is an operation on the target display area and is an operation on the shielding area. The shielding area is an area where the floating window is located and/or an area where the control for controlling the display state of the target display area is located in the target display area.

In some embodiments, there may be a need for two operating systems to respond to touch data at the same time. For example, when using a writing software of the external system, the screen content of the writing software can be projected to the main system, the main system exhibits the content of the writing software in a windowed form, and the user can control the writing software of the external system on the interface of the main system. The external system needs to transfer the picture to the main system for display after responding to the touch data, which will be slower than directly displaying on the main system. Therefore, in order to improve the writing speed, the external system and main system can be written at the same time, that is, the two systems respond to touch data at the same time, so that the handwriting that displays faster on the main system can be seen at the time of writing.

In view of this, in one embodiment, regardless of whether the current touch operation is an operation on the display content in the target display area, the touch data can be sent to the first operating system, that is, when the touch data of the current touch operation is acquired, the touch data of the touch operation is directly sent to the first operating system, and the first operating system determines whether to respond to the touch operation. In the case where the touch operation is an operation on the display content in the target display area, whether the first operating system responds to the touch operation is determined based on a preset strategy. It can be seen that whether to respond to the touch operation can be determined by the first operating system. For example, after MCU as the processing module receives the reported touch data, the touch data can be copied into two copies, one copy is directly transmitted to the first operating system, and the other copy is determined whether to send it to the second operating system based on whether the judgment condition (the condition of judging that the touch operation is an operation on the display content in the target display area) is satisfied. In this way, the requirements of the two systems responding at the same time can be satisfied, and as for whether to respond at the same time, which can be determined by the first operating system.

Regarding sending the touch data of the touch operation to the second operating system, it may be that the touch data is converted into data suitable for the second operating system and then sent to the second operating system.

Figure 5L:
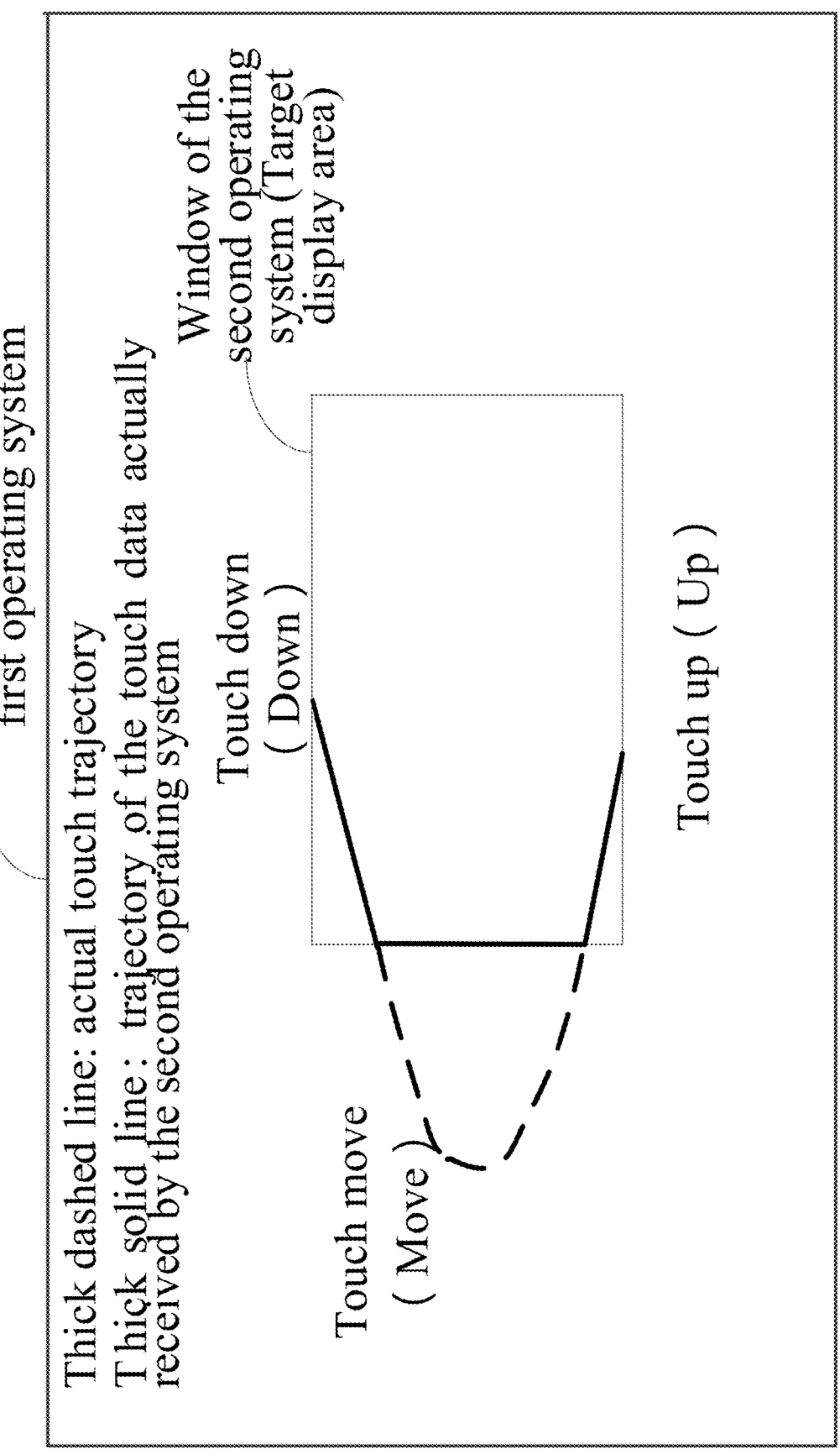
FIG. 5L is a schematic diagram of a touch trajectory according to an exemplary embodiment of the present disclosure.

In one embodiment, for a complete touch, in the process from touch down (Down) to touch up (Up), there may or may not be operations such as move (Move). Therefore, as shown in FIG. 5L, in this schematic diagram, one complete touch operation may include operations on the target display area and operations on areas other than the target display area. In order to maintain the integrity of the touch data, a complete set of touch data needs to be from Down to Up. In view of this, if the touch position of the touch object is inside the target display area when the touch object performs a touch-down event, and there is a touch position inside the target display area in the process of the continuous touch operation, according to the preset relationship between the touch-box coordinate system of the first operating system and the coordinate system of the second operating system, the touch data of the touch position inside the target display area is converted into touch data under the coordinate system of the second operating system. If the touch position of the touch object is inside the target display area when the touch object performs a touch-down event, and there is a touch position outside the target display area in the process of the continuous touch operation, the touch data of the touch position outside the target display area is converted into touch data closest to an edge of the target display area to acquire the touch data after the first conversion, and according to the preset relationship between the touch-box coordinate system of the first operating system and the coordinate system of the second operation system, the touch data after the first conversion is converted into touch data under the coordinate system of the second operating system, so as to acquire touch data after the second conversion. The second operating system may or may not have a corresponding touch screen. Therefore, the touch data needs to be converted into data suitable for the second operating system for use by the second operating system.

In one example, the conversion process of touch data can be completed by the first operating system or a processing module different from the first operating system, so that the second operating system can directly respond accordingly according to the converted touch data.

In another example, the conversion process of touch data can also be completed by the second operating system, the touch data is directly sent to the second operating system, and the second operating system converts the touch data into touch data under the coordinate system of the second operating system, and respond according to the converted touch data, thereby reducing the burden of the processing module.

Taking the conversion process of touch data completed by the first operating system or by a processing module different from the first operating system as an example, if the full-screen content of the second operating system is displayed in the target display area, the touch data corresponding to the touch operation is sent to the second operating system, including:

if the touch position of the touch object is inside the target display area when the touch object performs a touch-down event, and there is a touch position inside the target display area during a process of a continuous touch operation, according to the preset relationship between the touch-box coordinate system of the first operating system and the coordinate system of the second operating system, converting touch data of the touch position inside the target display area into touch data under the coordinate system of the second operating system, if the touch position of the touch object is inside the target display area when the touch object performs a touch-down event, and there is a touch position outside the target display area during the process of the continuous touch operation, converting touch data of the touch position outside the target display area into touch data closest to an edge of the target display area, and according to the preset relationship between the touch-box coordinate system of the first operating system and the coordinate system of the second operating system, converting the converted touch data closest to the edge of the target display area into touch data under the coordinate system of the second operating system, and sending the converted touch data under the coordinate system of the second operating system to the second operating system.

As shown in FIG. 5L, the actual touch trajectory is represented by a thick dashed line, and the trajectory of the touch data actually received by the second operating system is represented by a thick solid line. In this way, the second operating system can receive the touch data generated by the same touch object in one continuous touch operation, thereby ensuring the integrity of the data.

Regarding how to convert the touch data of the touch operation into the touch data closest to the edge of the target display area, in an example, it can be assumed that the touch data reported by the touch data collection module is (x, y), and data after the first conversion is (x1, y1), then:

if x<leftmost value (LEFT_touch) of the "target display area," x1=LEFT_touch, if x>rightmost value (RIGHT_touch) of "target display area," x1=RIGHT_touch, if x<=RIGHT_touch and x>=LEFT_touch, x1=x, if y<uppermost value (TOP_touch) of the "target display area," y1=TOP_touch, if y>lowest value (BOTTOM_touch) of the "target display area," y1=BOTTOM_touch, if y<=BOTTOM_touch and y>=TOP_touch, y1=y.

In this embodiment, the touch data of the touch operation is converted into the touch data closest to the edge of the target display area, which can not only ensure the integrity of the data, but also avoid false responses caused by the converted touch data. It should be understood that, in other embodiments, other conversion means may also be used to ensure the integrity of the continuous touch operation, which is specifically set according to requirements.

Regarding how to convert into the touch data under the coordinate system of the second operating system, as an example, the conversion of the touch data may be determined by a zooming relationship between the target display area and the area where the display content is located in the coordinate system of the second operating system. Taking exhibiting the full-screen content in the second operating system on the display interface of the first operating system as an example, the area where the display content is located is the full-screen area of the second operating system. It can be defined that x is x-axis data reported by the touch data collection module, y is y-axis data reported by the touch data collection module, x_source is touch x-axis data that needs to be reported to the second operating system, and y_source is touch y-axis data that needs to be reported to the second operating system. SourceWidth is a width of the screen resolution of the device where the second operating system is located, and SourceHeight is a height of the screen resolution of the device where the second operating system is located.

$$(x\text{-}LEFT\_touch)/(RIGHT\_touch\text{--}LEFT\_touch)=x\_source/SourceWidth$$

$$(y\text{-}TOP\_touch)/(BOTTOM\_touch\text{--}TOP\_touch)=y\_source/SourceHeight$$

That is, $$x\_source=(x\text{-}LEFT\_touch)*SourceWidth/(RIGHT\_touch\text{--}LEFT\_touch)$$

$$y\_source=(y\text{-}TOP\_touch)*SourceHeight/(BOTTOM\_touch\text{--}TOP\_touch)$$

The calculated x_source and y_source can be input into the second operating system.

Similarly, if the touch position of the touch operation is not inside the target display area, the touch data of the touch operation needs to be converted into the touch data closest to the edge of the target display area. For example, x and y in the formula can be firstly converted into x1 and y1, and then substituted into the formula, which will not be repeated herein.

In another example, when the second operating system does not display full-screen content, but a part of the content on the screen of the second operating system is exhibited on the display interface of the first operating system, it is called a partial area in this embodiment. The relationship between the target display area and the partial area of the screen can be acquired by x_source and y_source. Thereinto, the partial area of the screen is an area of the content for screen transmission in the second operating system.

If the touch position of the touch object is inside the target display area when the touch object performs a touch-down event, and there is a touch position inside the target display area during the process of the continuous touch operation, according to a preset relationship between the touch-box coordinate system of the first operating system and a coordinate range of the partial area, touch data of touch position inside the target display area is converted into touch data under the coordinate system of the second operating system, wherein the coordinate range of the partial area refers to a coordinate range of the partial area in the coordinate system of the screen corresponding to the second operating system.

If the touch position of the touch object is inside the target display area when the touch object performs a touch-down event, and there is a touch position outside the target display area during the process of the continuous touch operation, touch data of the touch position outside the target display area is converted into touch data closest to an edge of the target display area, and according to the preset the relationship between the touch-box coordinate system of the first operating system and the coordinate range of the partial area, the converted touch data closest to the edge of the target display area is converted into touch data under the coordinate system of the second operating system, the converted touch data under the coordinate system of the second operating system is sent to the second operating system.

When the full-screen content of the second operating system is displayed in the target display area, it is calculated with the resolution SourceWidth/SourceHeight of the display screen of the second operating system. When only a partial area of the screen of the second operating system is displayed in the target display area of the first operating system, SourceWidth/SourceHeight cannot be directly used for calculation, and the coordinate range of the partial area on the screen of the second operating system should be known. The partial area can be obtained by the second operating system and transmitted to the first operating system, and then transmitted to MCU by the first operating system. The coordinate range of the partial area on the screen of the second operating system can be composed of the following four coordinate values:

a leftmost coordinate value of the partial area LEFT_system2_window, an uppermost coordinate value of the partial area TOP_system2_window, a rightmost coordinate value of the partial area RIGHT_system2_window, a lowest coordinate value of the partial area BOTTOM_system2_window.

Calculation formulas are as follows.

$$(x-\text{LEFT\_touch})/(\text{RIGHT\_touch}-\text{LEFT\_touch})=\\(x\_source-\text{LEFT\_system2\_window})/\\(\text{RIGHT\_system2\_window}-\\\text{LEFT\_system2\_window})$$

$$(y-\text{TOP\_touch})/(\text{BOTTOM\_touch}-\text{TOP\_touch})=\\(y\_source-\text{TOP\_system2\_window})/\\(\text{BOTTOM\_system2\_window}-\\\text{TOP\_system2\_window})$$

That is, $$x\_source=(x-\text{LEFT\_touch})*\\(\text{RIGHT\_system2\_window}-\\\text{LEFT\_system2\_window})/(\text{RIGHT\_touch}-\\\text{LEFT\_touch})+\text{LEFT\_system2\_window}$$

$$y\_source=(y-\text{TOP\_touch})*\\(\text{BOTTOM\_system2\_window}-\\\text{TOP\_system2\_window})/(\text{BOTTOM\_touch}-\\\text{TOP\_touch})+\text{TOP\_touch}$$

The calculated x_source and y_source can be input into the second operating system.

For the case where the touch position of the touch object is inside the target display area when the touch object performs a touch-down event, and there is a touch position inside the target display area during a process of a continuous touch operation, through the above-mentioned means, the touch data of the touch position inside the target display area can be converted into the touch data under the coordinate system of the second operating system.

However, for the case where the touch position of the touch object is inside the target display area when the touch object performs a touch-down event, and there is a touch position outside the target display area during the process of the continuous touch operation, according to the above-mentioned calculation means in the embodiment, the touch data of the touch operation can be converted into touch data closest to an edge of the target display area, and then according to the above-mentioned calculation means in the embodiment, the converted touch data closest to the edge of the target display area can be converted into touch data under the coordinate system of the second operating system.

In some embodiments, the window of the second operating system is further provided with a button area for switching external channel signals, such as PC, Android box, HDMI, Type-c and the like.

In some embodiments, there may be a need to switch the external device, and in view of this, the external device can be switched to the first operating system or the second operating system through the control of USB Hub. External devices can be USB flash disks, cameras, microphones, and other devices.

Various technical features in the above embodiments can be combined arbitrarily, as long as there is no conflict or contradiction between the combinations of the features, but due to space limitations, they are not described one by one, therefore, arbitrary combination of the various technical features in the above embodiments also belongs to the scope of this description. The related technology in FIG. 3 is the same as that in FIG. 5A. For brevity purpose, no detailed description is given in the embodiment of FIG. 3.

Figure 6:
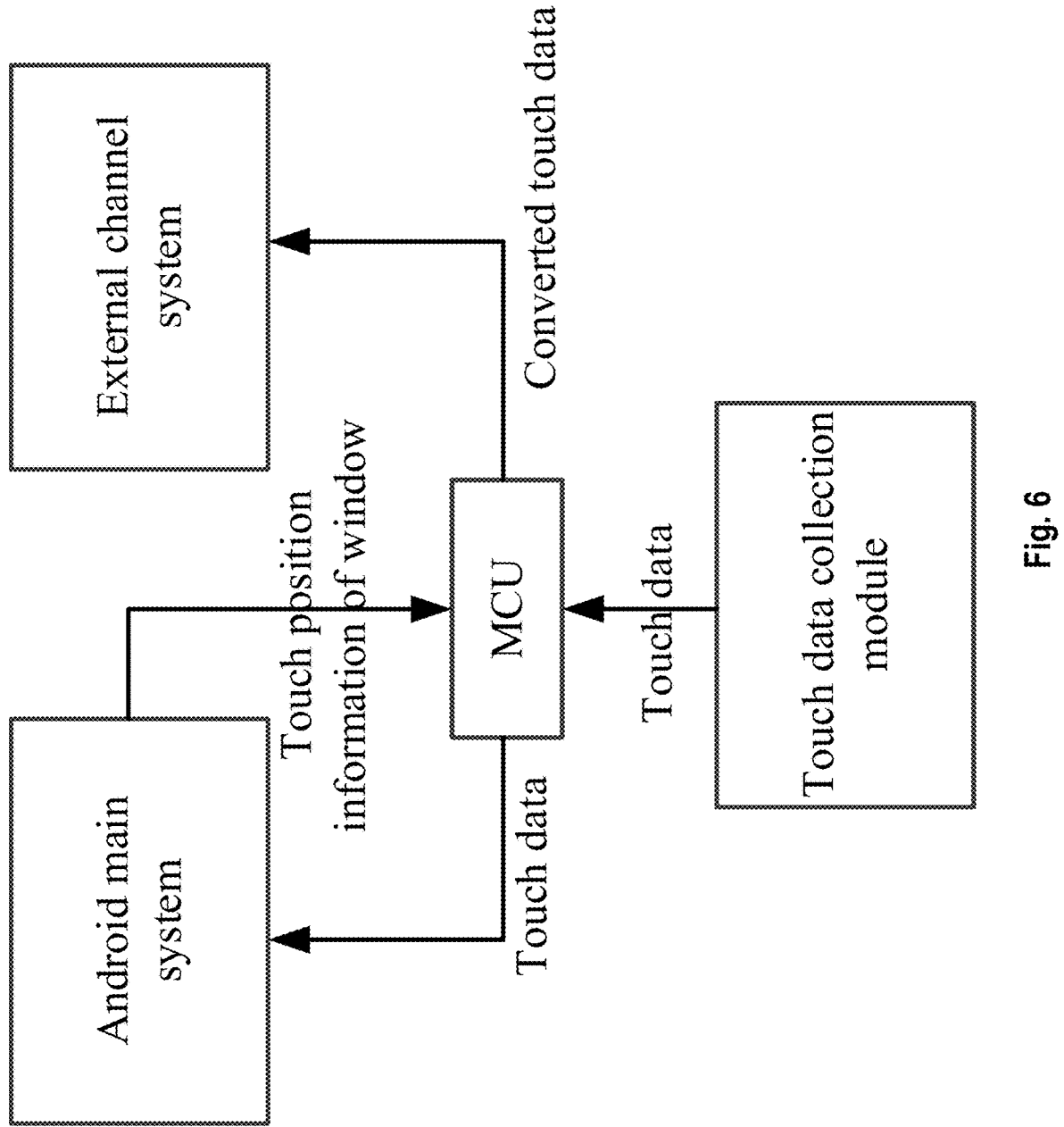
FIG. 6 is a data flow diagram according to an exemplary embodiment of the present disclosure.

As an example, taking an example that the first operating system and the second operating system are located on different devices, the first operating system may be Android main system in the display device, and the second operating system may be an external channel system. As shown in FIG. 6, it is a data flow diagram according to an exemplary embodiment of the present disclosure. In this schematic diagram, the processing module may be MCU, and the display content from the second operating system is displayed in a window of the display interface of the first operating system. Android main system sends the calculated touch-position information of the window to MCU. After the MCU receives the touch data sent by the touch data collection module, it can be judged whether the current touch operation is an operation on the display content in the window. If not, process is not performed directly; if yes, the touch data is then converted according to the coordinate system of the external channel system, and the converted touch data is sent to the external channel system, so that the display content of the external channel system can be exhibited in the display interface of the first operating system in a windowed form, and a touch return control of the window can be realized.

Corresponding to the above-mentioned embodiments of the touch data processing method, the present disclosure further provides embodiments of a touch data processing apparatus, an electronic device to which it is applied, and a computer storage medium.

Figure 7:
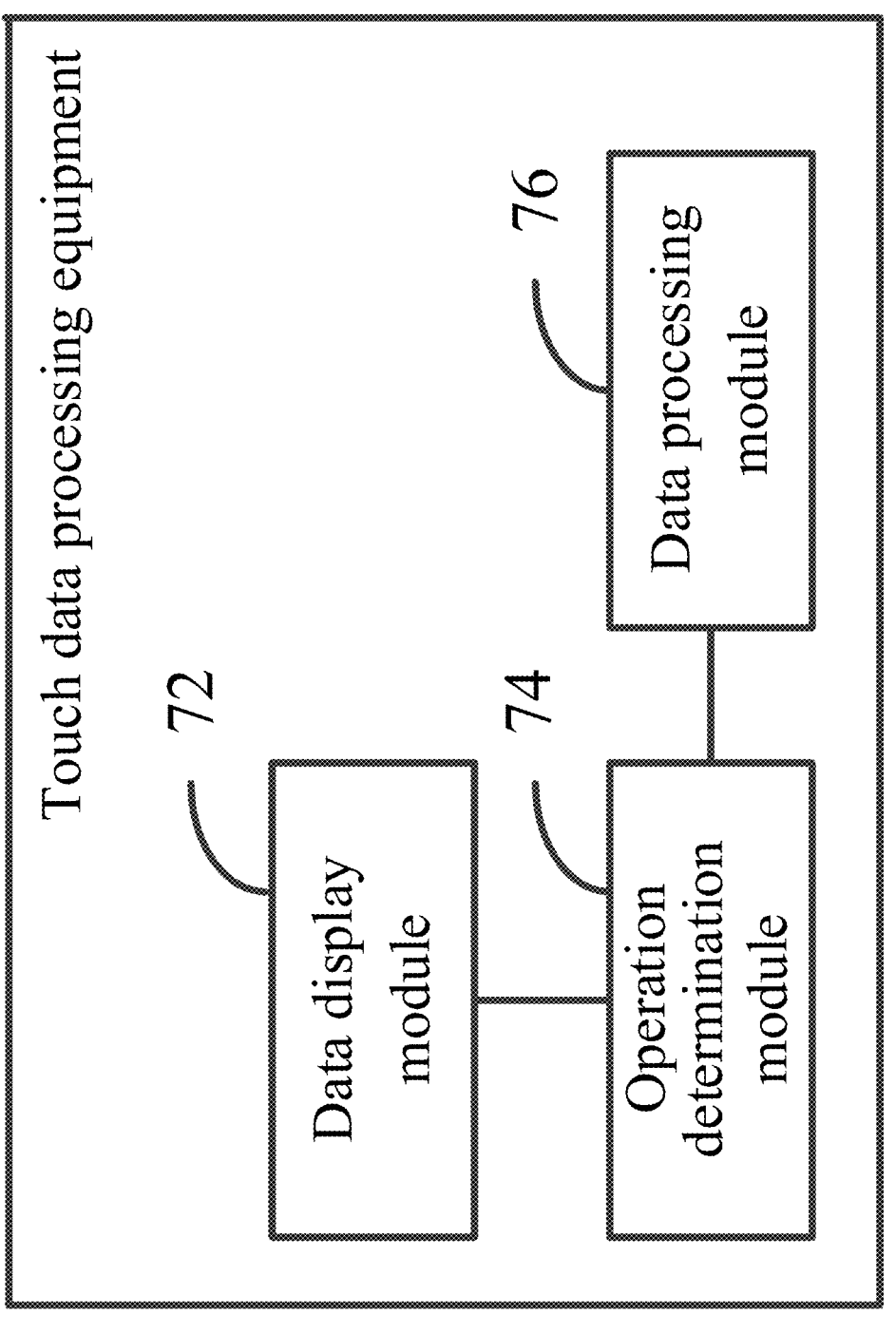
FIG. 7 is a block diagram of a touch data processing apparatus according to an exemplary embodiment of the present disclosure.

As shown in FIG. 7, it is a block diagram of a touch data processing apparatus according to an exemplary embodiment of the present disclosure. The first operating system and the second operating system are operating systems in the same device or in different devices, and the apparatus includes:

a data display module 72, configured to display a display content from the second operating system on a display interface of the first operating system, wherein the display content is displayed in a target display area of the display interface of the first operating system, an operation determination module 74, configured to, after a touch screen on a device where the first operating system is located is rotated by a preset angle, if a touch operation on the touch screen is detected, determine whether the touch operation is an operation on the display content in the target display area, and a data processing module 76, configured to, if the touch operation is an operation on the display content in the target display area, send touch data corresponding to the touch operation to the second operating system, so that the second operating system responds to the touch operation.

In some embodiments, the target display area is a partial area in the display interface of the first operating system.

In some embodiments, the display content is displayed in the display interface of the first operating system in a window display manner.

In some embodiments, the data display module 72 is further configured to:

if the touch operation is an operation on the display content in the target display area, display an updated display content in the target display area.

Thereinto, the updated display content is obtained by the second operating system updating the display content based on the touch operation, or obtained by the first operating system updating the display content based on the touch operation.

In some embodiments, a floating window, and/or a control for controlling a display state of the target display area is displayed in the target display area, and a touch operation acting on the floating window and the control is responded to by the first operating system.

In some embodiments, the data processing module 76 is further configured to:

after a display position of the target display area is adjusted, if the touch operation is an operation on the display content in an adjusted target display area, send the touch data of the touch operation to the second operating system, so that the second operating system responds to the touch operation.

Figure 8:
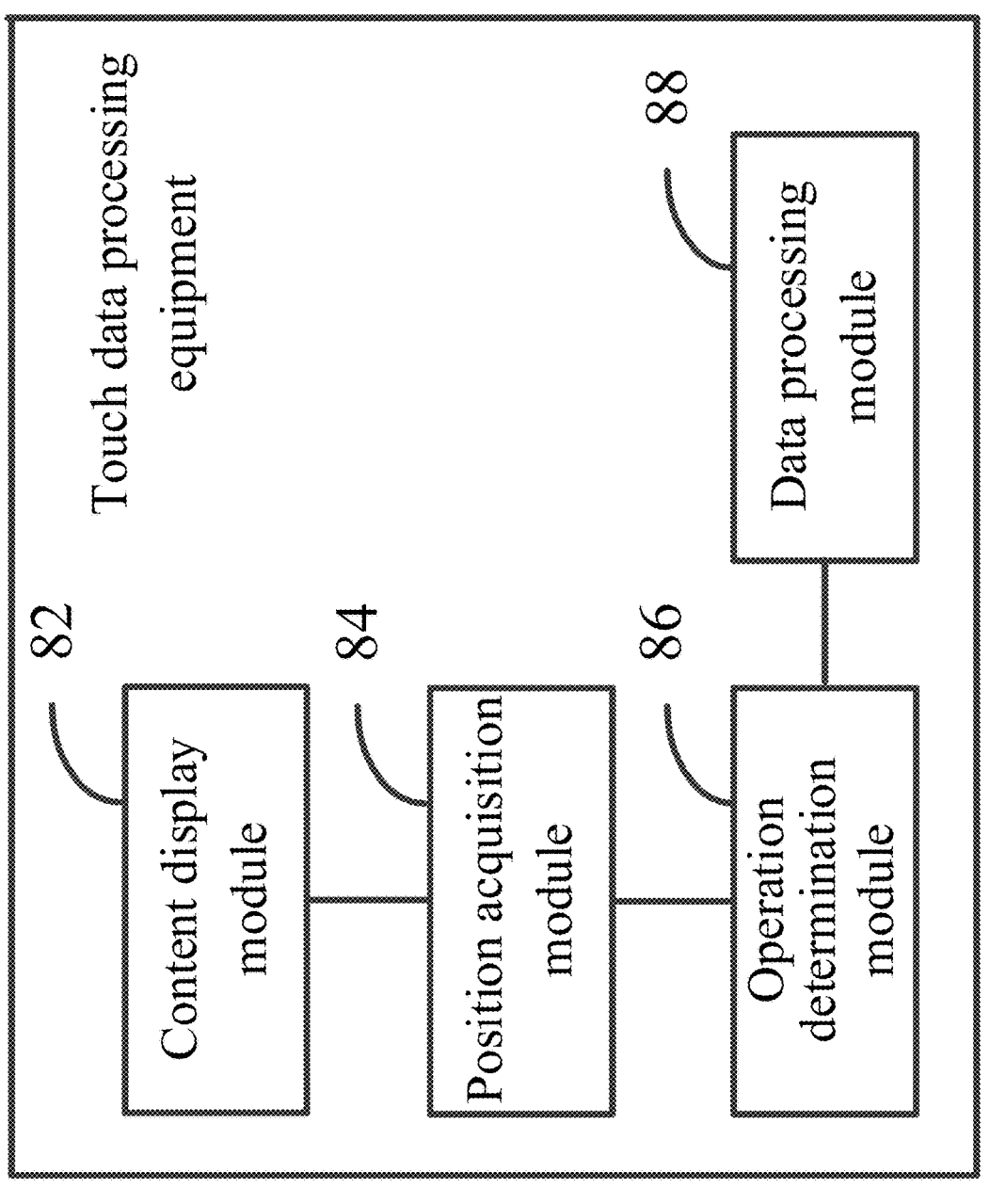
FIG. 8 is a block diagram of another touch data processing apparatus according to an exemplary embodiment of the present disclosure.

As shown in FIG. 8, it is a block diagram of another touch data processing apparatus according to an exemplary embodiment of the present disclosure. The first operating system and the second operating system are operating systems in the same device or in different devices, and the apparatus includes:

a content display module 82, configured to display a display content from the second operating system on a display interface of the first operating system, wherein the display content is displayed in a target display area of the display interface of the first operating system, a position acquisition module 84, configured to if a touch screen on a device where the first operating system is located is rotated by a preset angle, acquire touch-position information of the target display area, wherein the touch-position information is acquired by mapping position information of the target display area under a systematic coordinate system of the first operating system to a touch-box coordinate system of the first operating system, an operation determination module 86, configured to, when a touch operation on the display interface of the first operating system is detected, according to a relationship between the touch operation and the touch-position information, determine whether the touch operation is an operation on the display content in the target display area, and a data processing module 88, configured to, if the touch operation is an operation on the display content in the target display area, send touch data corresponding to the touch operation to the second operating system, so that the second operating system responds to the touch operation.

In some embodiments, the target display area is a partial area in the display interface of the first operating system.

In some embodiments, the display content is displayed in the display interface of the first operating system in a window display manner.

In some embodiments, the touch-position information is updated after the display position of the target display area is adjusted.

In some embodiments, the apparatus further includes a position calculation module (not shown in FIG. 8), configured to:

acquire system-position information of the target display area under the systematic coordinate system of the first operating system through a system interface, according to a preset relationship between a systematic coordinate system and a screen coordinate system, acquire screen-position information of the target display area in the screen coordinate system of the first operating system by mapping the system-position information, and according to a preset relationship between the screen coordinate system and a touch-box coordinate system, acquire the touch-position information of the target display area in the touch-box coordinate system of the first operating system by mapping the screen-position information.

In some embodiments, an origin of the touch-box coordinate system of the first operating system does not change with a rotation of the touch screen, and an origin of screen coordinate system of the first operating system does not change with a rotation of the touch screen, an origin of the systematic coordinate system of the first operating system will change with a rotation of the touch screen, the touch screen is a touch screen on a device where the first operating system is located.

A relationship between the systematic coordinate system and the screen coordinate system includes: a relationship between the systematic coordinate system and the screen coordinate system after the touch screen is rotated by a specified angle along a specified direction.

In some embodiments, a floating window, and/or a control for controlling a display state of the target display area is displayed in the target display area, and a touch operation acting on the floating window and the control is responded to by the first operating system.

In some embodiments, a judgment condition that the operation determination module 86 determines that the touch operation is an operation on the display content in the target display area includes:

the touch operation is an operation on the target display area, or the touch operation is an operation on the target display area, and is not an operation on a shield area, wherein the shield area is an area where the floating window is located and/or an area where the control for controlling the display state of the target display area is located in the target display area.

In some embodiments, a process of judging that the touch operation is an operation on the target display area includes:

when detecting that a touch object performs a touch-down event, a touch position of the touch object is inside the target display area, wherein the touch-down event is an event that occurs during the touch object performs a continuous touch operation.

In some embodiments, the data processing module 88 specifically configured to: if a full-screen content of the second operating system is displayed in the target display area, if the touch position of the touch object is inside the target display area when the touch object performs a touch-down event, and there is a touch position inside the target display area during the process of a continuous touch operation, according to the preset relationship between the touch-box coordinate system of the first operating system and the coordinate system of the second operating system, convert touch data of the touch position inside the target display area into touch data under the coordinate system of the second operating system, if the touch position of the touch object is inside the target display area when the touch object performs a touch-down event, and there is a touch position outside the target display area during the process of the continuous touch operation, convert touch data of the touch position outside the target display area into touch data closest to an edge of the target display area, and according to the preset relationship between the touch-box coordinate system of the first operating system and the coordinate system of the second operating system, convert the converted touch data closest to the edge of the target display area into touch data under the coordinate system of the second operating system, and send the converted touch data under the coordinate system of the second operating system to the second operating system.

In some embodiments, the data processing module 88 specifically configured to: if a content in the partial area of a screen of the second operating system is displayed in the target display area, if the touch position of the touch object is inside the target display area when the touch object performs a touch-down event, and there is a touch position inside the target display area during the process of the continuous touch operation, according to a preset relationship between the touch-box coordinate system of the first operating system and a coordinate range of the partial area, convert touch data of touch position inside the target display area into touch data under the coordinate system of the second operating system, wherein the coordinate range of the partial area refers to a coordinate range of the partial area in the coordinate system of the screen corresponding to the second operating system, if the touch position of the touch object is inside the target display area when the touch object performs a touch-down event, and there is a touch position outside the target display area during the process of the continuous touch operation, convert touch data of the touch position outside the target display area into touch data closest to an edge of the target display area, and according to the preset relationship between the touch-box coordinate system of the first operating system and the coordinate range of the partial area, convert the converted touch data closest to the edge of the target display area into touch data under the coordinate system of the second operating system, and send the converted touch data under the coordinate system of the second operating system to the second operating system.

In some embodiments, the data processing module 88 further configured to:

if the touch operation is not an operation on the display content in the target display area, send touch data of the touch operation to the first operating system, and the first operating system will respond to the touch operation, or directly send the touch data of the touch operation to the first operating system, and the first operating system will determine whether to respond to the touch operation, wherein in the case where the touch operation is an operation on the display content in the target display area, whether the first operating system responds to the touch operation is determined based on a preset strategy.

In some embodiments, the apparatus further includes a device switch module (not shown in FIG. 8), configured to: switch an external device to the first operating system or the second operating system through the control of USB Hub.

Correspondingly, an embodiment of the present disclosure further provides an electronic device. The device includes a memory and a processor. Thereinto, the memory stores a computer program, and the computer program is adapted to be loaded by the processor and execute steps of any one of the above-mentioned touch data processing methods.

In some embodiments, the electronic device is an interactive white board, the first operating system is Android system, and the second operating system is Windows system or a system on an external device connected to the interactive white board.

Correspondingly, an embodiment of the present disclosure further provides a computer storage medium. The computer storage medium stores a plurality of instructions, the instructions are adapted to be loaded by a processor and execute steps of any one of the above-mentioned touch data processing methods.

The present disclosure may adopt the form of a computer program product implemented on one or more storage media containing program codes (including but not limited to disk storage, CD-ROM, optical storage, etc.). Computer usable storage media include permanent and non-permanent, removable and non-removable media, and information storage can be achieved by any method or technology. The information can be computer-readable instructions, data structures, program modules, or other data. Examples of computer storage media include, but are not limited to: Phase-change Random Access Memory (PRAM), Static Random Access Memory (SRAM), Dynamic Random Access Memory (DRAM), other types of Random Access Memory (RAM), Read-Only Memory (ROM), Electrically Erasable Programmable Read-Only Memory (EEPROM), flash memory or other memories, Compact Disc Read-Only Memory (CD-ROM), Digital Versatile Disc (DVD) or other optical storage, magnetic cassette tape, magnetic disk storage or other magnetic storage devices or any other nontransmission media which can be used to store information capable of being accessed by computing devices.

For the specific details of the implementation process of the functions and actions of each module in the above device, please refer to the implementation process of the corresponding steps in the above-mentioned method, which will not be repeated herein.

For the apparatus embodiments, since they basically correspond to the method embodiments, reference may be made to the descriptions of the method embodiments for related parts. The apparatus embodiments described above are only illustrative, wherein the modules described as separate components may or may not be physically separated, and the components as display modules may or may not be physical modules, that is, they may be located in the same place, or distributed over multiple network modules. Some or all of the modules can be selected according to actual needs to achieve the purpose of the solution of the present disclosure. Those skilled in the art can understand and implement it without creative effort.

Figure 9:
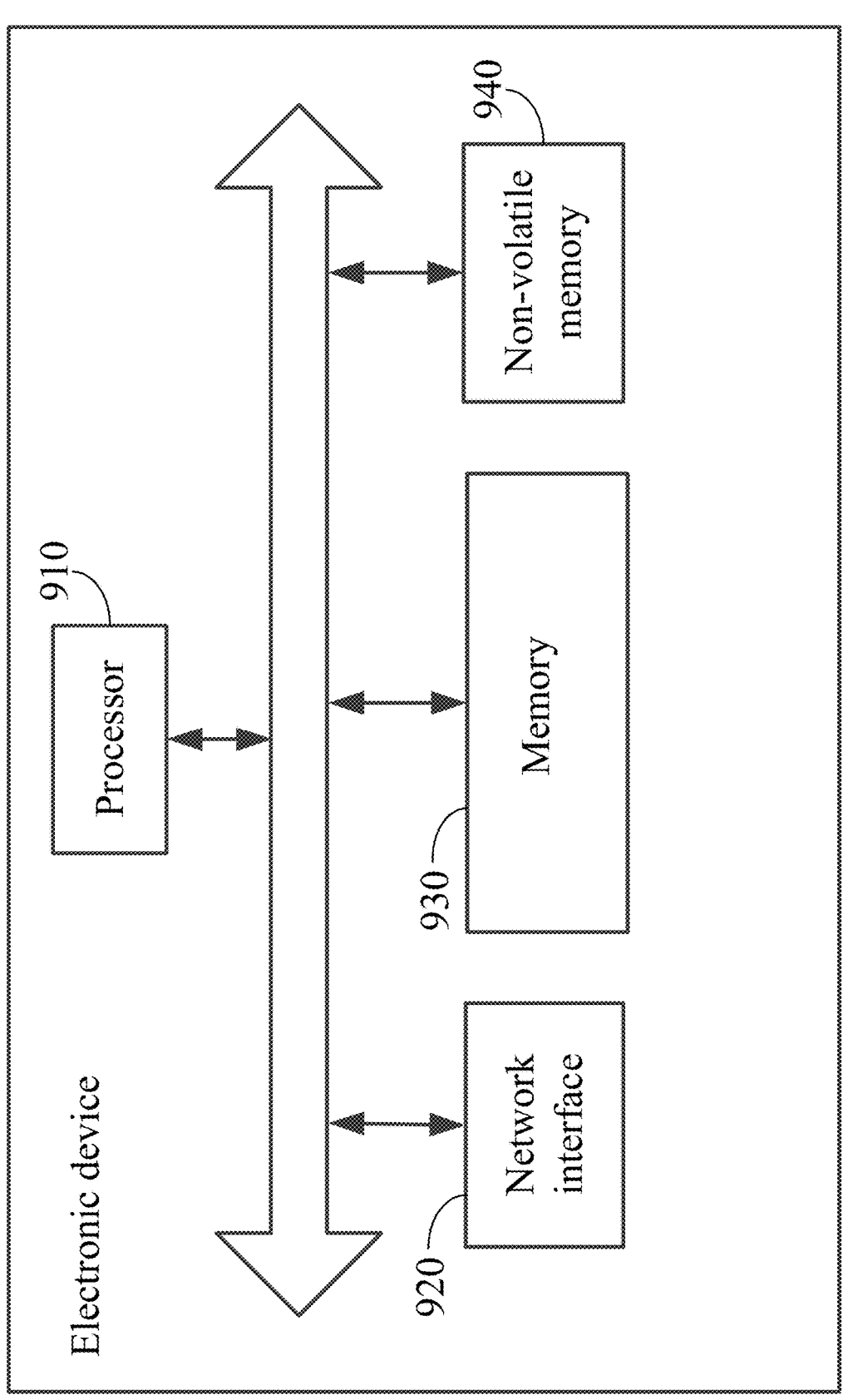
FIG. 9 is a hardware structure diagram of an electronic device where a touch data processing apparatus is located according to an exemplary embodiment of the present disclosure.

The embodiments of the touch data processing apparatus of the present disclosure can be applied to electronic device. The apparatus embodiment may be implemented by software, or may be implemented by hardware or a combination of software and hardware. Taking software implementation as an example, an apparatus in a logical sense is formed by reading the corresponding computer program instructions in the non-volatile memory into the memory for operation through the processor of the electronic device where the apparatus is located. From the perspective of hardware, as shown in FIG. 9, it is a hardware structure diagram of the electronic device where the touch data processing apparatus of the present disclosure is located. In addition to a processor 910, a network interface 920, a memory 930, and a non-volatile memory 940 shown in FIG. 9, the electronic device where the apparatus is located in the embodiment may also include other hardware generally according to the actual function of the electronic device, which will not be repeated herein.

After considering the description and practicing the embodiments provided herein, those skilled in the art will easily think of other implementing solutions of the present disclosure. The present disclosure is intended to cover any variations, usages or adaptations of the present disclosure which follow the general principles of the present disclosure and which include common knowledge or conventional techniques in the art which are not provided by the present disclosure. The description and embodiments are to be regarded as exemplary only, and the true scope and spirit of the present disclosure are indicated by the claims.

It should be understood that the present disclosure is not limited to the precise structures described above and illustrated in the accompanying drawings, and that various modifications and changes may be made without departing from its scope. The scope of the present disclosure is limited only by the appended claims.

The above-mentioned is only preferred embodiments of the present disclosure, and is not intended to limit the present disclosure. Any modifications, equivalent replacements, improvements, etc. made within the spirit and principles of the present disclosure shall be included in the present disclosure, and should be included within the claimed scope of the present disclosure.

What is claimed is:

1. A touch data processing method for an interactive white board, comprising:

displaying a display content from a second operating system on a display interface of a first operating system, wherein the display content is displayed in a target display area of the display interface of the first operating system of the interactive white board, and the second operating system is a system on the interactive white board different from the first operating system;

after a touch screen of the interactive white board is rotated by a preset angle, and in response to a touch operation on the touch screen being detected, acquiring touch-position information by:

acquiring system-position information of the target display area under a systematic coordinate system of the first operating system through a system interface;

acquiring screen-position information of the target display area under a screen coordinate system of the first operating system by mapping the system-position information to the screen-position information according to a relationship between the systematic coordinate system and the screen coordinate system; and acquiring the touch-position information of the target display area under a touch-box coordinate system of the first operating system by mapping the screen-position information to the touch-position information according to a relationship between the screen coordinate system and the touch-box coordinate system, wherein:

an origin of the systematic coordinate system of the first operating system is configured to change with a rotation of the touch screen, an origin of the screen coordinate system of the first operating system is configured to not change with a rotation of the touch screen, and an origin of the touch-box coordinate system of the first operating system is configured to not change with a rotation of the touch screen;

wherein:

a width and height of the touch-box coordinate system depend on a precision of the touch screen, a width and height of the systematic coordinate system depend on a resolution of the screen, and a width and height of the screen coordinate system depend on the resolution of the screen;

determining whether the touch operation is an operation on the display content in the target display area according to a relationship between the touch operation and the touch-position information; and in response to the touch operation being an operation on the display content in the target display area, converting touch data, which comprise a touch position of the touch operation in the touch-box coordinate system, according to a coordinate system of the second operating system, and sending the touch data from the first operating system to the second operating system, so that the second operating system responds to the touch operation.

2. The touch data processing method according to claim 1, wherein the method further comprises:

in response to the touch operation being an operation on the display content in the target display area, displaying an updated display content in the target display area, wherein the updated display content is obtained by the second operating system updating the display content based on the touch operation, or obtained by the first operating system updating the display content based on the touch operation.

3. The touch data processing method according to claim 1, wherein at least one of a floating window or a control for controlling a display state of the target display area is displayed in the target display area, and in response to the touch operation being an operation acting on at least one of the floating window or the control in the target display area, the touch operation is responded to by the first operating system.

4. The touch data processing method according to claim 1, wherein the method further comprises:

after a display position of the target display area is adjusted, in response to the touch operation being an operation on the display content in an adjusted target display area, the touch data of the touch operation is sent to the second operating system, so that the second operating system responds to the touch operation.

5. A touch data processing method for an interactive white board, comprising:

displaying a display content from a second operating system on a display interface of a first operating system, wherein the display content is displayed in a target display area of the display interface of the first operating system of the interactive white board, and the second operating system is a system on the interactive white board different from the first operating system;

in response to a touch screen of the interactive white board being rotated by a preset angle, and in response to a touch operation on the display interface of the first operating system being detected, acquiring touch-position information by:

acquiring system-position information of the target display area under a systematic coordinate system of the first operating system through a system interface; and acquiring the touch-position information of the target display area under a touch-box coordinate system of the first operating system by mapping the system-position information according to a relationship between the systematic coordinate system and the touch-box coordinate system, wherein:

an origin of the systematic coordinate system of the first operating system is configured to change with a rotation of the touch screen, and an origin of the touch-box coordinate system of the first operating system is configured to not change with a rotation of the touch screen;

wherein:

a width and height of the touch-box coordinate system depend on a precision of the touch screen, and a width and height of the systematic coordinate system depend on a resolution of the screen;

determining whether the touch operation is an operation on the display content in the target display area according to a relationship between the touch operation and the touch-position information; and in response to the touch operation being an operation on the display content in the target display area, converting touch data, which comprise a touch position of the touch operation in the touch-box coordinate system, according to a coordinate system of the second operating system, and sending the touch data from the first operating system to the second operating system, so that the second operating system responds to the touch operation.

6. The touch data processing method according to claim 5, wherein the touch-position information is updated after a display position of the target display area is adjusted.

7. The touch data processing method according to claim 5, wherein a relationship between the systematic coordinate system and a screen coordinate system comprises: a relationship between the systematic coordinate system and the screen coordinate system after the touch screen is rotated by a first angle along a first direction.

8. The touch data processing method according to claim 5, wherein at least one of a floating window or a control for controlling a display state of the target display area is displayed in the target display area, and in response to the touch operation being an operation acting on at least one of the floating window or the control in the target display area, the touch operation is responded to by the first operating system.

9. The touch data processing method according to claim 8, wherein a condition of determining that the touch operation is an operation on the display content in the target display area comprises:

the touch operation is an operation on the target display area; or the touch operation is an operation on the target display area, and is not an operation on a shield area, wherein the shield area is at least one of an area where the floating window is located or an area where the control for controlling the display state of the target display area is located in the target display area.

10. The touch data processing method according to claim 9, wherein a process of determining that the touch operation is an operation on the target display area comprises:

in response to detecting a touch object performing a touch-down event, determining that the touch position of the touch object during the touch operation is inside the target display area, wherein the touch-down event is an event that occurs during the touch object performing a continuous touch operation.

11. The touch data processing method according to claim 10, wherein in response to a full-screen content of the second operating system being displayed in the target display area, sending the touch data corresponding to the touch operation to the second operating system comprises:

in response to the touch position of the touch object being inside the target display area when the touch object performs a touch-down event, and the touch position being inside the target display area during a process of the continuous touch operation, according to a preset relationship between the touch-box coordinate system of the first operating system and a coordinate system of the second operating system, converting touch data of the touch position inside the target display area into touch data under the coordinate system of the second operating system;

in response to the touch position of the touch object being inside the target display area when the touch object performs a touch-down event, and the touch position being outside the target display area during the process of the continuous touch operation, converting touch data of the touch position outside the target display area into touch data closest to an edge of the target display area, and according to the preset relationship between the touch-box coordinate system of the first operating system and the coordinate system of the second operating system, converting the converted touch data closest to the edge of the target display area into touch data under the coordinate system of the second operating system; and sending the converted touch data under the coordinate system of the second operating system to the second operating system.

12. The touch data processing method according to claim 10, wherein in response to a content in a partial area of a screen of the second operating system being displayed in the target display area, sending the touch data corresponding to the touch operation to the second operating system comprises:

in response to the touch position of the touch object being inside the target display area when the touch object performs a touch-down event, and the touch position being inside the target display area during the process of the continuous touch operation, according to a preset relationship between the touch-box coordinate system of the first operating system and a coordinate range of the partial area, converting touch data of the touch position inside the target display area into touch data under a coordinate system of the second operating system, wherein the coordinate range of the partial area refers to a coordinate range of the partial area of the screen corresponding to the coordinate system of the second operating system;

in response to the touch position of the touch object being inside the target display area when the touch object performs a touch-down event, and the touch position being outside the target display area during the process of the continuous touch operation, converting touch data of the touch position outside the target display area into touch data closest to an edge of the target display area, and according to the preset relationship between the touch-box coordinate system of the first operating system and the coordinate range of the partial area, converting the converted touch data closest to the edge of the target display area into touch data under the coordinate system of the second operating system; and sending the converted touch data under the coordinate system of the second operating system to the second operating system.

13. The touch data processing method according to claim 5, wherein the method further comprises:

in response to the touch operation being not an operation on the display content in the target display area, sending touch data of the touch operation to the first operating system, and the first operating system is configured to respond to the touch operation; or directly sending the touch data of the touch operation to the first operating system, for the first operating system to determine whether to respond to the touch operation, wherein in the case where the touch operation is an operation on the display content in the target display area, whether the first operating system responds to the touch operation is determined based on a preset strategy.

14. The touch data processing method according to claim 5, wherein the method further comprises:

switching an external device to the first operating system or the second operating system through the control of Universal Serial Bus (USB) Hub.

15. An electronic device, comprising:

a memory storing computer-readable instructions; and a processor coupled to the memory and configured to execute the computer-readable instructions, wherein the computer-readable instructions, when executed by the processor cause the processor to perform operations comprising:

displaying a display content from a second operating system on a display interface of a first operating system, wherein the electronic device is an interactive white board, wherein the display content is displayed in a target display area of the display interface of the first operating system of the interactive white board, and the second operating system is a system on the interactive white board different from the first operating system;

after a touch screen on the interactive white board is rotated by a preset angle, and in response to a touch operation on the touch screen being detected, acquiring touch-position information by:

acquiring system-position information of the target display area under a systematic coordinate system of the first operating system through a system interface;

acquiring screen-position information of the target display area under a screen coordinate system of the first operating system by mapping the system-position information according to a relationship between the systematic coordinate system and the screen coordinate system; and acquiring the touch-position information of the target display area under a touch-box coordinate system of the first operating system by mapping the screen-position information according to a relationship between the screen coordinate system and the touch-box coordinate system, wherein:

an origin of the systematic coordinate system of the first operating system is configured to change with a rotation of the touch screen, an origin of the screen coordinate system of the first operating system is configured to not change with a rotation of the touch screen, and an origin of the touch-box coordinate system of the first operating system is configured to not change with a rotation of the touch screen;

wherein:

a width and height of the touch-box coordinate system depend on a precision of the touch screen, a width and height of the systematic coordinate system depend on a resolution of the screen, and a width and height of the screen coordinate system depend on the resolution of the screen;

determining whether the touch operation is an operation on the display content in the target display area according to a relationship between the touch operation and the touch-position information; and in response to the touch operation being an operation on the display content in the target display area, converting touch data, which comprise a touch position of the touch operation in the touch-box coordinate system, according to a coordinate system of the second operating system, and sending the touch data corresponding to the touch operation from the first operating system to the second operating system, so that the second operating system responds to the touch operation.

16. The electronic device according to claim 15, wherein the operations further comprise: in response to the touch operation being an operation on the display content in the target display area, displaying an updated display content in the target display area, wherein the updated display content is obtained by the second operating system updating the display content based on the touch operation, or obtained by the first operating system updating the display content based on the touch operation.

17. The electronic device according to claim 15, wherein the operations further comprise: after a display position of the target display area is adjusted, in response to the touch operation being an operation on the display content in an adjusted target display area, the touch data of the touch operation is sent to the second operating system, so that the second operating system responds to the touch operation.

18. The electronic device according to claim 17, wherein the first operating system is an Android system, and the second operating system is a Windows system.

19. The touch data processing method according to claim 1, wherein:

the preset angle comprises at least one of: 90 degrees, 180 degrees, or 270 degrees;

when the interactive white board is rotated by 0 degrees, the screen coordinate system is equal to the systematic coordinate system; and when the interactive white board is rotated clockwise by the preset angle, the systematic coordinate system is rotated counterclockwise by the preset angle relative to the screen coordinate system.

\* \* \* \* \*